(12) United States Patent
Wu et al.

(10) Patent No.: US 7,259,222 B2
(45) Date of Patent: Aug. 21, 2007

(54) COMPOSITIONS FOR USE IN GOLF BALLS

(75) Inventors: Shenshen Wu, North Dartmouth, MA (US); Manjari Kuntimaddi, Plymouth, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 362 days.

(21) Appl. No.: 11/032,411

(22) Filed: Jan. 10, 2005

(65) Prior Publication Data

US 2005/0119451 A1 Jun. 2, 2005

Related U.S. Application Data

(63) Continuation-in-part of application No. 10/859,557, filed on Jun. 2, 2004, now Pat. No. 7,105,628, which is a continuation-in-part of application No. 10/409,144, filed on Apr. 9, 2003, now Pat. No. 6,958,379, which is a continuation-in-part of application No. 10/228,311, filed on Aug. 27, 2002, now Pat. No. 6,835,794.

(51) Int. Cl.
*A63B 37/12* (2006.01)
*A63B 37/00* (2006.01)

(52) U.S. Cl. ............... 528/64; 528/68; 473/374; 473/378

(58) Field of Classification Search .............. None
See application file for complete search history.

(56) References Cited

U.S. PATENT DOCUMENTS

| | | | |
|---|---|---|---|
| 4,739,019 A | 4/1988 | Schappert et al. | |
| 4,808,691 A | 2/1989 | Konig et al. | |
| 4,849,544 A * | 7/1989 | Culley et al. | 564/461 |
| 5,230,714 A | 7/1993 | Steckel | |
| 5,316,730 A | 5/1994 | Blake et al. | |
| 5,484,870 A | 1/1996 | Wu | |
| 5,661,207 A | 8/1997 | Carlson et al. | |
| 5,688,191 A | 11/1997 | Cavallaro et al. | |
| 5,820,488 A | 10/1998 | Sullivan et al. | |
| 5,866,663 A | 2/1999 | Brookhart et al. | |
| 5,880,241 A | 3/1999 | Brookhart et al. | |
| 5,886,224 A | 3/1999 | Brookhart et al. | |
| 5,891,963 A | 4/1999 | Brookhart et al. | |
| 5,916,989 A | 6/1999 | Brookhart, III et al. | |
| 6,008,312 A | 12/1999 | Shirasaka | |
| 6,034,259 A | 3/2000 | Brookhart et al. | |
| 6,103,852 A | 8/2000 | Shirasaka | |
| 6,140,439 A | 10/2000 | Brookhart et al. | |
| 6,207,784 B1 | 3/2001 | Rajagopalan | |
| 6,218,493 B1 | 4/2001 | Johnson et al. | |
| 6,241,622 B1 | 6/2001 | Gobush et al. | |
| 6,286,364 B1 | 9/2001 | Aoyama et al. | |
| 6,310,163 B1 | 10/2001 | Brookhart et al. | |
| 6,476,130 B1 | 11/2002 | Rajagopalan et al. | |
| 6,488,591 B1 | 12/2002 | Gobush et al. | |
| 6,500,073 B1 | 12/2002 | Gobush et al. | |
| 6,565,455 B2 | 5/2003 | Hayashi et al. | |
| 6,565,456 B2 | 5/2003 | Hayashi et al. | |
| 6,573,353 B1 | 6/2003 | Brookhart et al. | |
| 6,610,812 B1 | 8/2003 | Wu et al. | |
| 2002/0098915 A1 * | 7/2002 | Cavallaro et al. | 473/354 |
| 2002/0115813 A1 | 8/2002 | Shirasaka | |
| 2003/0078348 A1 | 4/2003 | Rajagopalan et al. | |
| 2003/0119989 A1 | 6/2003 | Ladd et al. | |
| 2003/0125134 A1 | 7/2003 | Nardacci | |
| 2003/0144087 A1 * | 7/2003 | Rajagopalan et al. | 473/371 |
| 2003/0212240 A1 | 11/2003 | Wu et al. | |

* cited by examiner

Primary Examiner—David J. Buttner
(74) Attorney, Agent, or Firm—Mandi B. Milbank

(57) ABSTRACT

Golf balls comprising elastomer compositions are presently disclosed. These elastomer compositions comprise at least one polyamine having the structure:

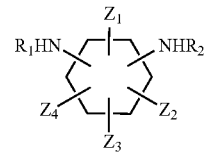

where $R_1$ and $R_2$ are the same or different radicals chosen from hydrogen and $C_1$-$C_{60}$ organic moieties: $Z_1$ is chosen from halogens and $C_1$-$C_{60}$ organic radicals: and $Z_2$, $Z_3$ and $Z_4$ are the same or different radicals chosen from hydrogen, halogens, and $C_1$-$C_{60}$ organic radicals. These elastomer compositions can be used in any one or more portions of the golf balls, such as inner core layer, intermediate core layer, outer core layer, intermediate layer, cover, inner cover layer, intermediate cover layer, and/or outer cover layer.

7 Claims, No Drawings

COMPOSITIONS FOR USE IN GOLF BALLS

CROSS-REFERENCE TO RELATED APPLICATIONS

This application is a continuation-in-part of U.S. patent application Ser. No. 10/859,557, filed Jun. 2, 2004, now U.S. Pat. No. 7,105,628, which is a continuation-in-part of U.S. patent application Ser. No. 10/409,144, filed Apr. 9, 2003, now U.S. Pat. No. 6,958,379, which is a continuation-in-part of U.S. patent application Ser. No. 10/228,311, filed Aug. 27, 2002, now U.S. Pat. No. 6,835,794.

FIELD OF INVENTION

The present disclosure is directed to golf balls and, more particularly, to novel compositions for use in golf balls and golf ball structures formed therefrom.

BACKGROUND OF INVENTION

Golf balls can be formed from a variety of compositions. Balata, a natural or synthetic trans-polyisoprene rubber, has been used to form golf ball covers. The softness of the balata cover allows the player to achieve spin rates sufficient to more precisely control ball direction and distance, particularly on shorter shots. However, balata covers lack the durability required by the average golfer, and are easily damaged. Accordingly, alternative cover compositions have been developed in an attempt to provide balls with spin rates and a feel approaching those of balata covered balls, while also providing a golf ball with a higher durability and overall distance.

Ionomer resins (e.g., copolymers of olefin, such as ethylene, and ethylenically unsaturated carboxylic acids, such as (meth)acrylic acids, wherein the acid groups are partially or fully neutralized by metal ions) have also been used as golf ball cover materials. Ionomer covers may be virtually cut-proof, but in comparison to balata covers, they display inferior spin and feel properties.

Polyurethanes and polyureas, by providing soft "feel," have also been recognized as useful materials for golf ball covers. However, conventional polyurethane covers do not match ionomer covers with respect to resilience or rebound. Unsaturated components (such as aromatic diisocyanate, aromatic polyol, and/or aromatic polyamine) used in a polyurethane or polyurea composition may at least in part attribute to the composition's susceptibility to discoloration and degradation upon exposure to thermal and actinic radiation, such as ultraviolet (UV) light. Conventional polyurethane covers can be prone to absorption of moisture, which is another mechanism through which desirable physical properties in the cover may be compromised.

Therefore, a continuing need remains for novel material compositions usable in forming golf ball portions (e.g., covers) having desirable and/or optimal combination of feel, resilience, cut, scratch and abrasion resistance, and interlayer adheresion, and capable of enhencing overall performance characteristics of the golf balls.

SUMMARY OF INVENTION

The present disclosure relates to golf equipment such as golf balls, golf clubs (drivers, putters, woods, irons, and wedges, including heads and shafts thereof), golf shoes, golf gloves, golf bags, or the like that comprise novel polyurethane, polyurea, and/or poly(urethane-co-urea) compositions. The components of the compositions can be saturated, i.e., substantially free of double or triple carbon-carbon bonds or aromatic groups, to produce light stable compositions. Components that are unsaturated or partially saturated can also be used.

The golf ball can comprise at least one thermoplastic, thermoset, castable, or millable material formed from a composition comprising at least one polyamine having the structure:

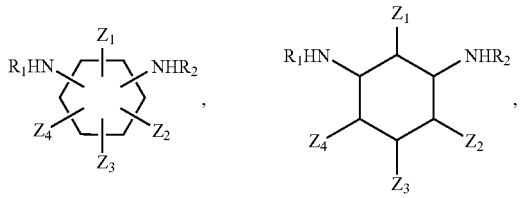

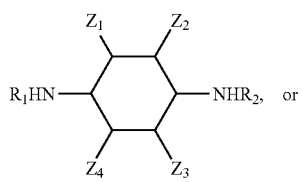

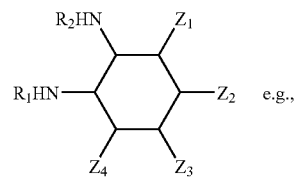

where $R_1$ and $R_2$ are the same or different radicals chosen from hydrogen and organic moieties having about 1-60 carbon atoms; $Z_1$ is chosen from halogens and organic radicals having about 1-60 carbon atoms; and $Z_2$ to $Z_4$ are the same or different radicals chosen from hydrogen, halogens, and organic radicals having about 1-60 carbon atoms. $Z_1$ and $Z_4$ may be the same or different halogens or organic radicals having about 1-60 carbon atoms. $Z_1$, $Z_2$, and $Z_4$ may be the same or different halogens or organic radicals having about 1-60 carbon atoms. $Z_1$, $Z_2$, and $Z_3$ may be the same or different halogens or organic radicals having about 1-60 carbon atoms. $Z_2$, $Z_3$, and $Z_4$ may be the same or different halogens or organic radicals having about 1-60 carbon atoms. $Z_1$, $Z_2$, $Z_3$, and $Z_4$ may be the same or different halogens or organic radicals having about 1-60 carbon atoms.

Suitable organic radicals include, without limitation, alkyl (e.g., linear or branched $C_1$-$C_6$ alkyl), aryl, aralkyl, alicyclic, cycloalkyl, and alkoxy groups; halogenated or non-halogenated hydrocarbon radicals having 1-20 carbon atoms, and halogenated or non-halogenated organic moieties having at least one O, N, S, or Si atom and 1-12 carbon atoms, such as methyl, ethyl, n-propyl, n-butyl, n-pentyl, n-hexyl, iso-propyl, iso-butyl, sec-butyl, t-butyl, neo-pentyl, $R_1$ and $R_2$ can be independently chosen from hydrogen, propanenitrile, maleate, cyclopentyl, cyclohexyl, and —$SCH_3$ groups. For example, the polyamine may be one of the following:

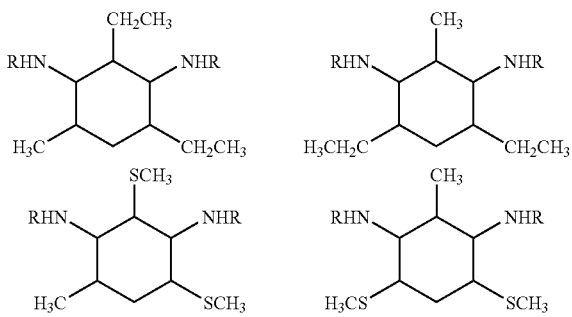

where R is the same or different radicals each comprising hydrogen, linear or branched $C_1$-$C_6$ alkyl groups, propanenitrile groups, or maleate groups.

The composition may further comprise at least one prepolymer formed from at least one polyisocyanate and at least one isocyanate-reactive telechelic chosen from polyol telechelics, polyamine telechelics, and aminoalcohol telechelics. The polyisocyanate and the isocyanate-reactive telechelic can both be saturated. Alternatively, the polyamine disclosed herein reacts with a polyisocyanate to form a prepolymer. Any of the prepolymers may be substantially saturated. The material formed from the composition may be thermoplastic or thermoset.

The material may at least in part form at least one portion of the golf ball chosen from intermediate core layer, outer core layer, intermediate layer, cover, inner cover layer, intermediate cover layer, outer cover layer, coating layer, discontinuous layer, wound layer, foamed layer, lattice network layer, web or net, adhesion or coupling layer, barrier layer, layer of uniformed or non-uniformed thickness, layer having a plurality of discrete elements, and layer filled with liquid, gel, powder, and/or gas. The formed layer may have a thickness of 0.005 inches to 0.125 inches, and/or a Shore D hardness of 20-80.

DEFINITIONS

As used herein, the terms "araliphatic," "aryl aliphatic," or "aromatic aliphatic" all refer to compounds that contain one or more aromatic moieties and one or more aliphatic moieties, where the reactable functional groups such as, without limitation, isocyanate groups, amine groups, and hydroxyl groups are directly linked to the aliphatic moieties and not directly bonded to the aromatic moieties. Illustrative examples of araliphatic compounds are o-, m-, and p-tetramethylxylene diisocyanate (TMXDI).

The subscript letters such as m, n, x, y, and z used herein within the generic structures are understood by one of ordinary skill in the art as the degree of polymerization (i.e., the number of consecutively repeating units). In the case of molecularly uniformed products, these numbers are commonly integers, if not zero. In the case of molecularly non-uniformed products, these numbers are averaged numbers not limited to integers, if not zero, and are understood to be the average degree of polymerization.

Any numeric references to amounts, unless otherwise specified, are "by weight." The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer.

As used herein, the term "polymer" is used to refer to oligomers, adducts, homopolymers, random copolymers, pseudo-copolymers, statistical copolymers, alternating copolymers, periodic copolymer, bipolymers, terpolymers, quaterpolymers, other forms of copolymers, substituted derivatives thereof, and mixtures thereof. These polymers can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric.

As used herein, the term "telechelic" is used to refer to polymers having at least two terminal reactive end-groups capable of entering into further polymerization through these reactive end-groups. Reactive end-groups disclosed herein include, without limitation, amine groups, hydroxyl groups, isocyanate groups, carboxylic acid groups, thiol groups, and combinations thereof.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

For molecular weights, whether $M_n$ or $M_w$, these quantities are determined by gel permeation chromatography using polystyrene as standards as is well known to those skilled in the art and such as is discussed in U.S. Pat. No. 4,739,019 at column 4, lines 2-45, which is incorporated herein by reference in its entirety.

As used herein, the terms "formed from" and "formed of" denote open, e.g., "comprising," claim language. As such, it is intended that a composition "formed from" or "formed of" a list of recited components be a composition comprising at least these recited components, and can further comprise other non-recited components during formulation of the composition.

As used herein, the term "cure" as used in connection with a composition, e.g., "a curable material," "a cured composition," shall mean that any crosslinkable components of the composition are at least partially crosslinked. In certain examples of the present disclosure, the crosslink density of the crosslinkable components, i.e., the degree of crosslinking, can range from 5% to 100% of complete crosslinking. In other examples, the crosslink density can range from 35% to 85% of full crosslinking. In other examples, the crosslink density can range from 50% to 85% of full crosslinking. One skilled in the art will understand that the presence and degree of crosslinking, i.e., the crosslink density, can be determined by a variety of methods, such as dynamic mechanical thermal analysis (DMTA) in accordance with ASTM E1640-99.

As used herein, the term "saturated" or "substantially saturated" means that the compound or material of interest is fully saturated (i.e., contains no double bonds, triple bonds, or aromatic ring structures), or that the extent of unsaturation is negligible, e.g., as shown by a bromine number in accordance with ASTM E234-98 of less than 10, such as less than 5.

DESCRIPTION

The compositions of the present disclosure typically comprise a reaction product (e.g., an elatomer) of a polyisocyanate and one or more reactants. The elastomer compositions of the present disclosure can be resilient. Resilience can be measured, for example, by determining the percentage of the original height to which a ½" steel ball will rebound after being dropped onto an immobilized ½" thick elastomer sample from a height of one meter. A resilient elastomer can display a rebound height percentage of greater than 60%, such as greater than about 70%, or greater than about 75%.

In one example, the reaction product can be a polyurethane formed from a polyurethane prepolymer and a curative, the polyurethane prepolymer being a reaction product of a polyol telechelic and an isocyanate. The polyol telechelic comprises at least two terminal hydroxyl end-groups that are independently primary, secondary, or tertiary. The polyol telechelic can further comprise additional hydroxyl groups that are independently located at the termini, attached directly to the backbone as pendant groups, and/or located within pendant moieties attached to the backbone. The polyol telechelic can be α,ω-hydroxy telechelics having isocyanate-reactive hydroxyl end-groups on opposing termini. All polyol telechelics are polyols, which include monomers, dimers, trimers, adducts, and others having two or more hydroxyl groups.

In another example, the reaction product can be a polyurea formed from a polyurea prepolymer and a curative, the polyurea prepolymer being a reaction product of a polyamine telechelic and an isocyanate. The polyamine telechelic comprises at least two terminal amine end-groups that are independently primary or secondary. The polyamine telechelic can further comprise additional amine groups that are independently primary or secondary, and are independently located at the termini, attached directly to the backbone as pendant groups, located within the backbone, or located within pendant moieties that are attached to the backbone. The secondary amine moieties may in part form single-ring or multi-ring heterocyclic structures having one or more nitrogen atoms as members of the rings. The polyamine telechelic can be α,ω-amino telechelics having isocyanate-reactive amine end groups on opposing termini. All polyamine telechelics are polyamines, which also include monomers, dimers, trimers, adducts, and the like having two or more amine groups.

In a further example, the reaction product can be a poly(urethane-urea) formed from a poly(urethane-urea) prepolymer and a curative. The poly(urethane-urea) prepolymer can be a reaction product of an isocyanate and a blend of polyol and polyamine telechelics. Alternatively, the poly (urethane-urea) prepolymer can be a reaction product of an aminoalcohol telechelic and an isocyanate. The aminoalcohol telechelic comprises at least one primary or secondary terminal amine end-group and at least one terminal hydroxyl end-group. The polyamine telechelic can further comprise additional amine and/or hydroxyl groups that are independently located at the termini, attached directly to the backbone as pendant groups, located within the backbone, or located within pendant moieties that are attached to the backbone. The secondary amine moieties may in part form single-ring or multi-ring heterocyclic structures having one or more nitrogen atoms as members of the rings. The aminoalcohol telechelic can be α-amino-ω-hydroxy telechelics having isocyanate-reactive amine and hydroxyl end groups on opposing termini. All aminoalcohol telechelics are aminoalcohols, which also include monomers, dimers, trimers, adducts, and the like having at least one amine group and at least one hydroxyl group.

Any one or combination of two or more of the isocyanate-reactive ingredients disclosed herein can react with stoichiometrically deficient amounts of polyisocyanate such as diisocyanate to form elastomers that are substantially free of hard segments. Such elastomers can have rubber elasticity and wear resistance and strength, and can be millable.

Polyamine telechelics have two, three, four, or more amine end-groups capable of forming urea linkages (such as with isocyanate groups), amide linkages (such as with carboxyl group), imide linkages, and/or other linkages with other organic moieties. As such, polyamine telechelics can be reacted with polyacids to form amide-containing polyamine or polyacid telechelics, be reacted with isocyanates to form polyurea prepolymers, and be used as curatives to cure various prepolymers. Any one or more of the hydrogen atoms in the polyamine telechelic (other than those in the terminal amine end-groups) may be substituted with halogens, cationic groups, anionic groups, silicon-based moieties, ester moieties, ether moieties, amide moieties, urethane moieties, urea moieties, ethylenically unsaturated moieties, acetylenically unsaturated moieties, aromatic moieties, heterocyclic moieties, hydroxy groups, amine groups, cyano groups, nitro groups, and/or any other organic moieties. For example, the polyamine telechelics may be halogenated, such as having fluorinated backbones and/or N-alkylated fluorinated side chains.

Any polyamine telechelics available or known to one of ordinary skill in the art are suitable for use in compositions of the present disclosure. The $M_w$ of the polyamine telechelics can be about 100-20,000, such as about 150, about 200, about 230, about 500, about 600, about 1,000, about 1,500, about 2,000, about 2,500, about 3,000, about 3,500, about 4,000, about 5,000, about 8,000, about 10,000, about 12,000, about 15,000, or any $M_w$ therebetween. The polyamine telechelic can comprise one or more hydrophobic and/or hydrophilic segments.

Exemplary polyamine telechelics, such as α,ω-amino telechelics, include polyamine polyhydrocarbons (e.g., polyamine polyolefins), polyamine polyethers, polyamine polyesters (e.g., polyamine polycaprolactones), polyamine polyamides (e.g., polyamine polycaprolactams), polyamine polycarbonates, polyamine polyacrylates (e.g., polyamine polyalkylacrylates), polyamine polysiloxanes, polyamine polyimines, polyamine polyimides, and polyamine copolymers including polyamine polyolefinsiloxanes (such as α,ω-diamino poly(butadiene-dimethylsiloxane) and α,ω-diamino poly(isobutylene-dimethylsiloxane)), polyamine polyetherolefins (such as α,ω-diamino poly(butadiene-oxyethylene)), polyamine polyetheresters, polyamine polyethercarbonates, polyamine polyetheramides, polyamine polyetheracrylates, polyamine polyethersiloxanes, polyamine polyesterolefins (such as α,ω-diamino poly(butadiene-caprolactone) and α,ω-diamino poly(isobutylene-caprolactone)), polyamine polyesteramides, polyamine polyestercarbonates, polyamine polyesteracrylates, polyamine polyestersiloxanes, polyamine polyamideolefins, polyamine polyamidecarbonates, polyamine polyamideacrylates, polyamine polyamidesiloxanes, polyamine polyamideimides, polyamine polycarbonateolefins, polyamine polycarbonateacrylates, polyamine polycarbonatesiloxanes, polyamine polyacrylateolefins (such as α,ω-diamino poly(butadiene-methyl methacrylate), α,ω-diamino poly(isobutylene-t-butyl methacrylate), and α,ω-diamino poly(methyl methacrylate-butadiene-methyl methacrylate)), polyamine polyacrylate siloxanes, polyamine polyetheresteramides, any other polyamine copolymers, and blends thereof. Suitable polyamine telechelics, including generic structures and specific examples, are disclosed in parent application bearing Ser. No. 10/859,557 and Publication No. US 2004-0220378 A1, the entirety of which is incorporated by express reference herein.

Polyamines suitable for use in the present disclosure include any and all organic compounds having two, three, four, or more amine groups in the molecule that are capable of forming urea linkages (such as with isocyanate groups) or amide linkages (such as with carboxyl group). The polyamine can be aromatic, araliphatic, aliphatic, alicyclic, heterocyclic, saturated or unsaturated, and each molecule has at least two isocyanate-reactive amine groups independently being primary or secondary. Depending on the number of isocyanate-reactive amine groups being present, polyamines may be referred to as diamines, triamines, tetramines, and other higher polyamines.

Aromatic polyamines may have one or more monocyclic or aromatic polycyclic (fused, spiro, and/or bridged) aromatic rings, where at least two isocyanate-reactive amine groups are directly attached to the rings. Aromatic polyamines can have about 6-60 carbon atoms, such as about 6-22 carbon atoms. Non-limiting examples of single-ring aromatic diamines include o-, m-, or p-phenylenediamine, 1,2-, 1,3-, or 1,4-bis(sec-butylamino) benzene, toluene diamine, 3,5-diethyl-(2,4- or 2,6-)toluenediamine, 3,5-dimethylthio-(2,4- or 2,6-)toluenediamine, and 3,5-diethylthio-(2,4- or 2,6-)toluenediamine. Illustrative examples of fused polycyclic aromatic diamines are 1,4-, 1,6-, 1,8-, and 2,7-diaminonaphthalene.

Non-limiting examples of dual-ring aromatic polyamines include 4,4'-diaminodiphenyl ether, 4,4'-diaminodiphenylmethane ("MDA"), 4,4'-diaminodiphenylpropane, 3,3'-diethyl-4,4'-diaminodiphenylmethane, 3,3'-diethyl-5,5'-dimethyl-4,4'-diaminodiphenylmethane, 3,3'-dichloro-4,4'-diaminodiphenylmethane ("MOCA"), 3,3'-diethyl-5,5'-dichloro-4,4'-diaminodiphenylmethane, 3,3',5,5'-tetraethyl-4,4'-diaminodiphenylmethane ("MDEA"), 3,3',5,5'-tetraisopropyl-4,4'-diaminodiphenylmethane, 3,3'-dimethyl-5,5'-diisopropyl-4,4'-diaminodiphenylmethane, 3,3'-diethyl-5,5'-diisopropyl-4,4'-diaminodiphenylmethane, 3,3'-dimethyl-5,5'-di-t-butyl-4,4'-diaminodiphenylmethane, 2,2'-dichloro-3,3',5,5'-tetraethyl-4,4'-diaminodiphenylmethane ("MCDEA"), 3,3'-dichloro-4,4'-diaminodiphenylmethane, 2,2',3,3'-tetrachloro-4,4'-diaminodiphenylmethane ("MDCA"), 4,4'-bis(sec-butylamino)-diphenylmethane, 3,3'-dichloro-2,2',6,6'-tetraethyl-4,4'-diaminodiphenylmethane, and N,N'-dialkylamino-diphenylmethane.

Araliphatic polyamines may have one or more monocyclic or polycyclic (fused, spiro, and/or bridged) aromatic rings having substituted aliphatic chains, where at least two isocyanate-reactive amine groups are attached to the aliphatic chains rather than the aromatic rings. Araliphatic polyamines can have about 6-60 carbon atoms, such as about 6-22 carbon atoms. Examples of araliphatic polyamines include aminoalkylbenzenes such as o-, m-, or p-xylylenediamine.

Aliphatic polyamines have a linear or branched, saturated or unsaturated, substituted or unsubstituted primary aliphatic chain, optionally having heteroatoms such as N, O, S, or Si present in the primary chain, where at least two isocyanate-reactive amine groups are attached to the primary chain or side chains or pendant moieties branching off the primary chain. Aliphatic polyamines can have about 60 carbon atoms or less, such as about 2-30 carbon atoms. Non-limiting examples of aliphatic diamines include primary diamines such as ethylene diamine, 1,3-propylene diamine, 2-methylpentamethylene diamine, 1,3-pentanediamine, neopentyldiamine, hexamethylene diamine, 2,2,4- and 2,4,4-trimethyl-1,6-hexane diamine, imino-bis(propylamine), methylimino-bis(propylamine) (i.e., N-(3-aminopropyl)-N-methyl-1,3-propanediamine, N,N-bis(aminopropyl)-methylamine), N,N-bis(aminopropyl)ethylamine, N,N-bis(aminopropyl)hexylamine, and N,N-bis(aminopropyl)octylamine; secondary diamines such as N,N'-diethylmaleate-2-methylpentamethylene diamine (Desmophen® NH 1220); primary/secondary diamines such as 2-(ethylamino)ethylamine, 3-(methylamino)propylamine, and N,N-dimethyldipropylenetriamine. Other aliphatic polyamines, such as fatty polyamines, alkylene polyamines, alkoxylated diamines, hydroxy polyamines, and condensed polyamines are disclosed in detail herein.

Alicyclic polyamines may have one or more carbon-based, saturated or hydrogenated, monocyclic or polycyclic (fused, spiro, and/or bridged) rings, optionally having substituted aliphatic chains on the rings or linking multiple rings, where at least two isocyanate-reactive amine groups are attached to the rings and/or the aliphatic chains. Alicyclic polyamines can have about 6-60 carbon atoms, such as about 6-30 carbon atoms. Non-limiting examples of alicyclic diamines include monocyclics such as 1,2-, 1,3-, or 1,4-diamino-cyclohexane, 1-methyl-2,6-diamino-cyclohexane, 1,3- or 1,4-bis(methylamino)-cyclohexane, 1,2-, 1,3-, or 1,4-bis(aminomethyl)cyclohexane, 1,2- or 1,4-bis(sec-butylamino)-cyclohexane, isophorone diamine, and N,N'-diisopropyl-isophorone diamine (Jefflink® 754); and polycyclics such as 2,2'-, 2,4'-, or 4,4'-diamino-dicyclohexylmethane, 3,3'-dimethyl-4,4'-diamino-dicyclohexylmethane (i.e., dimethyl dicykan), 3,3'-diethyl-5,5'-dimethyl-4,4'-diamino-dicyclohexylmethane, 3,3'-dichloro-4,4'-diamino-dicyclohexylmethane, 3,3'-diethyl-5,5'-dichloro-4,4'-diamino-dicyclohexylmethane, 3,3',5,5'-tetraethyl-4,4'-diamino-dicyclohexylmethane (a.k.a. 4,4'-methylene-bis(2,6-diethylaminocyclohexane)), 2,2'-dichloro-3,3',5,5'-tetraethyl-4,4'-diamino-dicyclohexylmethane, 3,3'-dichloro-4,4'-diamino-dicyclohexylmethane, 2,2',3,3'-tetrachloro-4,4'-diamino-dicyclohexylmethane, 3,3'-dichloro-2,2',6,6'-tetraethyl-4,4'-dicyclohexylmethane, 4,4'-bis(sec-butylamino)-dicyclohexylmethane (Clearlink® 1000), N,N'-dialkylamino-dicyclohexylmethane, 3,3'-dimethyl-4,4'-bis(sec-butylamino)-dicyclohexylmethane (Clearlink® 3000), N,N'-di(ethylmaleate-amino)-dicyclohexylmethane (Desmophen® NH 1420), N,N'-di(ethylmaleate-amino)-dimethyl-dicyclohexylmethane (Desmophen® 1520), 4,4'-diamino-dicyclohexylpropane, 2,5- or 2,6-bis(aminomethyl) norbornane, and bis(aminomethyl)tricyclodecane (TCD diamine).

Heterocyclic polyamines may have one or more saturated or unsaturated, monocyclic or polycyclic (fused, spiro, and/or bridged) rings having one or more heteroatoms, such as O, N, and S, optionally having substituted aliphatic chains on the rings or linking multiple rings, where at least two isocyanate-reactive amine groups are attached to the rings and/or the aliphatic chains, or in part form the rings. Heterocyclic polyamines can have about 4-60 carbon atoms, such as about 4-30 carbon atoms, and include aziridines, azetidines, azolidines, pyridines, pyrroles, indoles, piperidines, imidazoles, imidazolines, piperazines, isoindoles, purines, morpholines, thiomorpholines, oxazolidines, thiazolidines, N-aminoalkylmorpholines, N-aminoalkylthiomorpholines, N-aminoalkylpiperazines, N,N'-diaminoalkylpiperazines, azepines, azocines, azonines, azecines, tetra-, di- and perhydro derivatives thereof, and mixtures of two or more thereof. Saturated 5- and 6-membered heterocyclic polyamines can comprise only N, O, and/or S in the hetero ring, such as piperidines, piperazines, thiomorpholines, morpholines, pyrrolidines, aminoalkyl-substituted derivatives thereof, and the like. The aminoalkyl substituents can be substituted on a nitrogen atom forming part of the hetero ring.

Non-limiting examples of heterocyclic diamines include piperazine, N-(aminoalkyl)-piperazine, N-(aminoethyl)piperazine, N-(aminopropyl)piperazine, bis(aminoalkyl)piperazine, bis(aminoethyl)piperazine, bis(aminopropyl)piperazine, 2-, 3-, or 4-aminomethyl-piperidine, aminoethylpiperazine, aminopropylpiperazine, bis(piperidyl) alkane, 1,3-di(4-piperidyl)propane, 3-amino-pyrrolidine, homopiperazine, 2-methyl-piperazine, cis-2,6-dimethyl-piperazine, 2,5-dimethyl-piperazine, N-(2-imidazole) piperazine, histamine (i.e., 4-(β-aminoethyl)imidazole), N-(aminoethyl)imidazole, N-(aminopropyl)imidazole, and N-aminopropylmorpholine.

Non-limiting examples of triamines include diethylene triamine, dipropylene triamine, N-(aminopropyl)ethylenediamine, N-(aminoethyl)butylenediamine, N-(aminopropyl) butylenediamine, N-(aminoethyl)hexamethylenediamine, N-(aminopropyl)hexamethylenediamine, 4-aminomethyloctane-1,8-diamine, (propylene oxide)-based triamines (a.k.a. polyoxypropylene triamines), trimethylolpropane-based triamines, glycerin-based triamines, 3-(2-aminoethyl)aminopropylamine (i.e., N-(2-aminoethyl)-1,3-propylenediamine, $N_3$-amine), N,N-bis(2-((aminocarbonyl)amino)ethyl)urea, N,N',N"-tris(2-aminoethyl)methanetriamine, N1-(5-aminopentyl)-1,2,6-hexanetriamine, 1,1,2-ethanetriamine, N,N', N"-tris(3-aminopropyl)methanetriamine, N1-(2-aminoethyl)-1,2,6-hexanetriamine, N1-(10-aminodecyl)-1,2,6-hexanetriamine, 1,9,18-octadecanetriamine, 4,10,16,22-tetraazapentacosane-1,13,25-triamine, N1-(3-((4-((3-aminopropyl)amino)butyl)amino)propyl)-1,2,6-hexanetriamine, di-9-octadecenyl-(Z,Z)-1,2,3-propanetriamine, 1,4,8-octanetriamine, 1,5,9-nonanetriamine, 1,9,10-octadecanetriamine, 1,4,7-heptanetriamine, 1,5,10-decanetriamine, 1,8,17-heptadecanetriamine, 1,2,4-butanetriamine, 1,3,5-pentanetriamine, N1-(4-((3-aminopropyl)amino)butyl)-1,2, 6-hexanetriamine, 2,5-dimethyl-1,4,7-heptanetriamine, N1-6-aminohexyl-1,2,6-hexanetriamine, 6-ethyl-3,9-dimethyl-3,6,9-undecanetriamine, 1,5,11-undecanetriamine, 1,6,11-undecanetriamine, N,N-bis(aminomethyl)methanediamine, N,N-bis(2-aminoethyl)-1,3-propanediamine, methanetriamine, N1-(2-aminoethyl)-N-2-(3-aminopropyl)-1,2, 5-pentanetriamine, N1-(2-aminoethyl)-1,2,6-hexanetriamine, 2,6,11-trimethyl-2,6,11-dodecanetriamine, 1,1,3-propanetriamine, 6-(aminomethyl)-1,4,9-nonanetriamine, 1,2,6-hexanetriamine, N2-(2-aminoethyl)-1,1,2-ethanetriamine, 1,3,6-hexanetriamine, N,N-bis(2-aminoethyl)-1,2-ethanediamine, 3-(aminomethyl)-1,2,4-butanetriamine, 1,1,1-ethanetriamine, N1,N1-bis(2-aminoethyl)-1,2-propanediamine, 1,2,3-propanetriamine, and 2-methyl-1,2,3-propanetriamine (all saturated). Non-limiting examples of tetramines include triethylene tetramine (i.e., bis(aminoethyl)ethylenediamine), tetraethylene tetramine, tripropylene tetramine, N,N'-bis(3-aminopropyl) ethylenediamine (a.k.a. $N_4$-amine, N,N'-1,2-ethanediylbis-(1,3-propanediamine), 1,5,8,12-tetrazadodecane), bis(aminoethyl)propylenediamine, bis(aminoethyl) butylenediamine, bis(aminopropyl)butylenediamine, bis (aminoethyl)hexamethylenediamine, bis(aminopropyl) hexamethylenediamine. Illustrative examples of other higher polyamines include tetraethylene pentamine (also saturated). pentaethylene hexamine, polymethylene-polyphenylamine.

Fatty polyamines can have in the main carbon chain at least about 8 carbon atoms (including carbon atom(s) in the carboxylic acid group(s), if directly attached to the main carbon chain), such as 10, 12, 16, 18, 20, 22, 28, 30, 36, 40, 44, 50, 54, or 60 carbon atoms, or any numbers therebetween. The main carbon chain can be directed attached to at least one, such as two or more, isocyanate-reactive amine functionality, which can be primary and/or secondary. The fatty polyamines can be monomer diamines, dimer diamines or trimer triamines derived from fatty polyacids disclosed herein, using textbook techniques such as by reacting the dimerized fatty acids with ammonia to obtain the corresponding dimerized fatty nitriles which may then be hydrogenated to form the dimer diamines.

The fatty polyamines can have the formula $R_1$—(NH—$R_2$)$_x$—$NH_2$ where $R_1$ is a linear or branched alkyl group having about 8-40 carbon atoms, such as about 10-35 carbon atoms, or about 12-18 carbon atoms; $R_2$ is a divalent moiety having 1 to about 8 carbon atoms, such as about 2-6 carbon atoms, or about 2-4 carbon atoms; and x is about 1-6, such as about 1-4. $R_1$ and $R_2$ can be linear or branched, saturated or unsaturated, or combination thereof. $R_1$ can be chosen from linear decyl, dodecyl, hexadecyl and octadecyl, $R_2$ can be ethylene or propylene, and x is about 1-3. These fatty polyamines may be prepared by conventional methods, such as sequential cyanoethylation reduction reactions. Commercially available examples include those with $R_1$ being octadecyl, $R_2$ being propylene, and x being 1, 2 or 3 (tallow diamine, tallow triamine, and tallow tetramine, respectively), available from ExxonMobil Chemical Company of Houston, Tex.

Alkylene polyamines are represented by the formula RHN—[R'—N(R)]$_x$—H, where each R is independently hydrogen, aliphatic, or hydroxy-substituted aliphatic group of up to about 30 carbon atoms; R' is alkylene moiety having about 1-10 carbon atoms, such as about 2-6 carbon atoms, or about 2-4 carbon atoms; n is about 1-10, such as about 2-7 or about 2-5. Such alkylene polyamines include methylene polyamines, ethylene polyamines, propylene polyamines, butylene polyamines, pentylene polyamines, etc. The higher homologs, such as those obtained by condensing two or more alkyleneamines, and related heterocyclic amines, such as piperazines and N-amino alkyl-substituted piperazines, are also included.

Alkylene polyamines like ethylene polyamines can be a complex mixture of polyalkylene polyamines including cyclic condensation products. The term "polyalkylene polyamine" as used herein is intended to include polyalkylene polyamines in pure or relatively pure form, mixtures of such materials, and crude polyalkylene polyamines, which may contain minor amounts of other compounds. Other useful types of polyamine mixtures are those resulting from stripping of the polyalkylene polyamine mixtures to leave, as residue, what is often termed "polyamine bottoms." In general, alkylene polyamine bottoms can be characterized as having less than 2%, usually less than 1% (by weight) material boiling below about 200° C. These alkylene polyamine bottoms include cyclic condensation products such as piperazine and higher analogs of diethylenetriamine, triethylenetetramine and the like. These alkylene polyamine bottoms may be reacted solely with the acylating agent or they may be used with other amines, polyamines, or mixtures thereof.

Specific examples of such polyamines are ethylenediamine, diethylenetriamine, triethylenetetramine, tris-(2-aminoethyl)amine, propylenediamine, dipropylenetriamine, tripropylenetetramine, tetraethylenepentamine, pentaethylenehexamine, hexaethyleneheptamine, N-(2-aminoethyl) piperazine, N,N-bis(2-aminoethyl)-ethylenediamine, diaminoethyl triaminoethylamine, and the like. The corresponding polypropylene polyamines and the polybutylene polyamines can also be employed. Still other polyamines can be recognized by those skilled in the art and the present disclosure can be used with such polyamines.

Polyamines can be condensation reaction products of at least one hydroxy compound with at least one polyamine reactant containing two or more primary and/or secondary amine groups. The hydroxy compound includes polyols and polyol amines disclosed herein. Polyol amines include aminoalcohols having two or more hydroxyl groups, and reaction products of monoamines with alkylene oxides (e.g., ethylene oxide, propylene oxide, butylene oxide, etc.) having about 2-20 carbon atoms, such as about 2-4 carbon atoms. Non-limiting examples of polyol amines include tri(hydroxypropyl)amine, tris(hydroxymethyl)aminomethane (THAM), 2-amino-2-methyl-1,3-propanediol, N,N,N',N'-tetrakis(2-hydroxypropyl)ethylenediamine, and N,N,N',N'-tetrakis(2-hydroxyethyl)ethylenediamine.

Any polyamines of the present disclosure may react with the polyols and polyol amines to form the condensate polyamines. Non-limiting examples include triethylenetetramine (TETA), tetraethylenepentamine (TEPA), pentaethylenehexamine (PEHA), and mixtures of polyamines such as the alkylene polyamine bottoms. The condensation reaction can be conducted at about 60-265° C., such as about 220-250° C., in the presence of an acid catalyst. Materials and conditions to form the condensate polyamines are described in U.S. Pat. No. 5,230,714, the disclosure of which is incorporated herein by reference.

Conventional polyamines can be fast reacting with isocyanates. In order to extend the pot-life of the composition and improve processability, polyamine reactivity may be slowed by using sterically hindered amine groups. For example, 4,4'-bis-(sec-butylamino)-dicyclohexylmethane and N,N'-diisopropyl-isophorone diamine are secondary diamines having moderated reactivity.

One or more or all of the reactable amine groups within the polyamine compound can be sterically hindered, so that the polyamine compound can provide the combination of reduced reactivity toward isocyanate groups, and improved chemical stability toward actinic radiations such as UV light. Sterically hindered NHR group can have the structure:

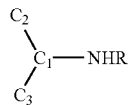

where $C_1$, $C_2$, and $C_3$ are independent tertiary (i.e., methine) or quaternary carbon atoms, and R is as defined above. One, two, or all three of $C_1$, $C_2$, and $C_3$ can be free of C—H bonds. $C_1$, $C_2$, and $C_3$ may in part form a substituted ring structure having about 4-30 carbon atoms. The ring structure may be saturated, unsaturated, aromatic, monocyclic, polycyclic (e.g., bicyclic, tricyclic, etc.), or heterocyclic having one or more O, N, or S atoms. The ring structure may have one, two, three, or more moieties of the above structure, while the polyamine compound may have one, two, or more of such ring structures. For example, sterically hindered polyamine may have a structure of:

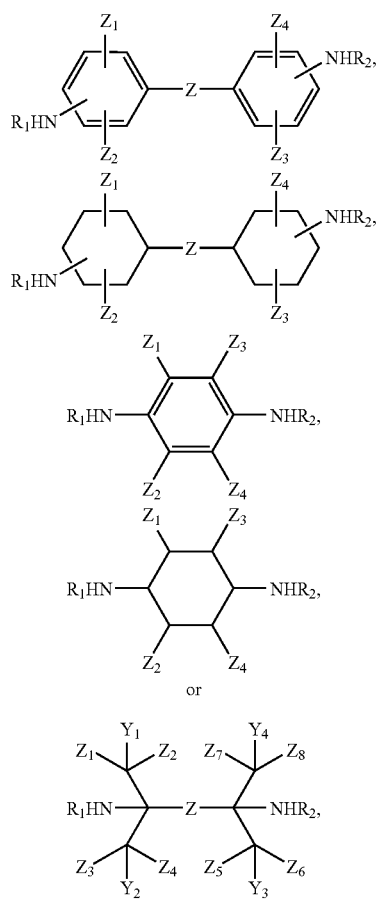

where $Z_1$ to $Z_8$ are independently chosen from halogenated or non-halogenated hydrocarbon moieties having about 1-20 carbon atoms, halogenated or non-halogenated organic moieties having at least one O, N, S, or Si atom and zero to about 12 carbon atoms, or halogens; $Y_1$ to $Y_4$ are independently chosen from hydrogen, halogenated or non-halogenated hydrocarbon moieties having about 1-20 carbon atoms, halogenated or non-halogenated organic moieties having at least one O, N, S, or Si atom and zero to about 12 carbon atoms, and halogens; Z is halogenated or non-halogenated hydrocarbon moieties having about 1-60 carbon atoms, or halogenated or non-halogenated organic moieties having at least one O, N, S, or Si atom and zero to about 60 carbon atoms. Z can have one of the following structures:

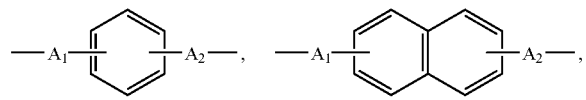

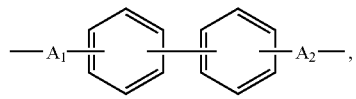

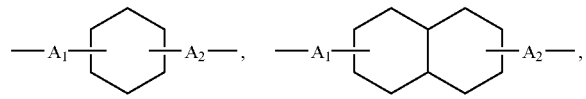

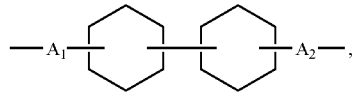

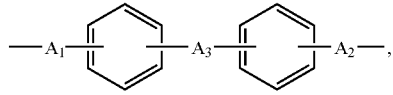

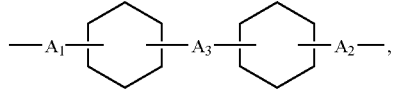

where $A_1$ to $A_3$ are independently chosen from halogenated or non-halogenated hydrocarbon moieties having about 1-36 carbon atoms, and halogenated or non-halogenated organic moieties having at least one O, N, S, or Si atom and zero to about 30 carbon atoms. Any one or more, or all of $Z_1$ to $Z_8$ can be hydrogen. As a non-limiting example, Z may be —C(CH$_3$)$_2$—. Other non-limiting examples include 1,4-durene diamine, 2,3,5,6-tetramethyl-1,4-diaminocyclohexane, and:

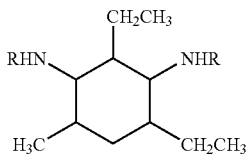 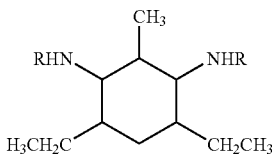

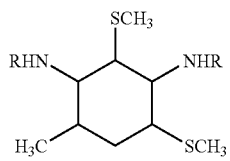 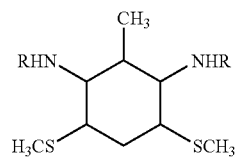

where R is the same or different, chosen from hydrogen and linear or branched $C_1$-$C_6$ alkyl groups, such as methyl, ethyl, propyl, butyl, pentyl, hexyl, iso-propyl, iso-butyl, sec-butyl, and neo-pentyl groups, propanenitrile groups, and maleate groups.

Sterically hindered polyamines can also have a generic structure of:

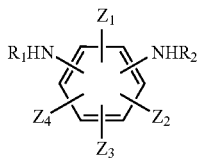 or 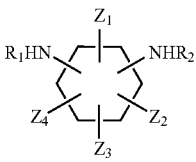

where $R_1$, $R_2$ and $Z_1$ to $Z_4$ are independently chosen from hydrogen and organic moieties having about 1-60 carbon atoms, such as about 1-20, about 1-12, or about 1-6 carbon atoms. Suitable organic moieties can be linear or branched, saturated or unsaturated, aliphatic, alicyclic, aromatic, or araliphatic, halogenated or otherwise substituted, optionally having one or more heteroatoms such as O, N, S, or Si, and include hydrocarbon moieties such as alkyl, alkyloxy, alkylthio, or alkylsilyl moieties. NHR$_1$ and NHR$_2$ can be in ortho, meta, or para positions with respect to one another. One or more of $Z_1$ to $Z_4$ can be NHR$_3$, where $R_3$ is analogous to $R_1$ and $R_2$.

In one example, $R_1$ and $R_2$ are both hydrogen, and at least one of $Z_1$ to $Z_4$, such as two or more thereof, is/are the organic moieties described above, having 2 or more carbon atoms, or being branched and having 3 or more carbon atoms. In another example, at least one of $R_1$ and $R_2$ can be the organic moiety other than hydrogen, having 2 or more carbon atoms, such as being branched and having 3 or more carbon atoms. In a further example, at least one of $R_1$, $R_2$, and $Z_1$ to $Z_4$ can have one or more primary or secondary amine groups, such as one or more primary amine end-groups distal to the ring structure. In yet another example, the sterically hindered polyamine can be regioselective; that is, at least a first amine group has a reactivity different from that of a second amine group, all else being equal. The regioselectivity may result from difference in steric interference around the two different amine groups (i.e., steric asymmetry). Scenarios which may result in regioselectivity include: a) the first amine is secondary, while the second amine is primary; b) the first amine is sterically hindered by one or more ortho-positioned organic moieties, on one side or both sides, while the second amine has none; or c) the first amine is sterically hindered by two or more ortho-positioned organic moieties on both sides, while the second amine has only one ortho-positioned organic moiety.

Sterically hindered dual- or multi-ring polyamines can have a generic structure of:

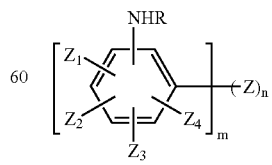 or 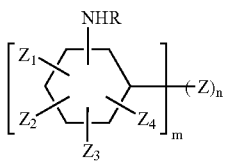

where R is the same or different on different rings, chosen from hydrogen and organic moieties having about 20 carbon atoms or less, such as 1-12 carbon atoms; $Z_1$ to $Z_4$, each being the same or different on different rings, are independently chosen from hydrogen, halides, and organic moieties having 1-12 or 1-6 carbon atoms; Z is a divalent or polyvalent organic moiety having a molecular weight of at least about 14, such as about 5,000 or less, or about 1,000 or less; m is 2 when n is 0, about 2-6 when n is 1, such as 2, 3, or 4. Organic moieties for R, Z, and $Z_1$ to $Z_4$ can be linear or branched, saturated or unsaturated, aliphatic, alicyclic, aromatic, or araliphatic, halogenated or otherwise substituted, optionally having one or more heteroatoms such as O, N, S, or Si, such as hydrocarbon moieties. Z may be as small as O or $CH_2$, or comprise polymeric chains such as polyhydrocarbon, polyether, polyester, polyamide, polycarbonate, polyacrylate, polysiloxane, and copolymer chains thereof. Alternatively, Z may comprise at least two ester and/or amide linkages.

In one example, R is hydrogen, at least one of $Z_1$ to $Z_4$, such as two or more thereof, is/are the organic moieties described above, such as having two or more carbon atoms, or branched having 3 or more carbon atoms, and is/are ortho to NHR. In another example, each NHR is an ortho- or meta-substituent with respect to Z. In a further example, at least one R is an organic moiety, such as having 2 or more carbon atoms, or branched having 3 or more carbon atoms. In yet another example, at least one of R and $Z_1$ to $Z_4$ has one or more primary or secondary amine groups, such as at least one primary amine end-group distal to the ring. In still another example, the sterically hindered polyamine is regioselective, having one of the following scenarios: i) a first NHR is secondary, while a second NHR is primary; ii) the first NHR is sterically hindered by one or more ortho-positioned organic moieties on one side or both sides, while the second NHR has none; or iii) the first NHR is sterically hindered by two or more ortho-positioned organic moieties one both sides, while the second NHR has only one-ortho-positioned organic moiety.

Certain sterically hindered polyamines described above can be obtained by reacting one or more ortho- or meta-isomers of cyclic amino acids or esters thereof, such as (organo)amino(organo)benzene (organo)acids (including aminobenzoic acids, aminobenzene organoacids, amino-organobenzoic acids, organo-aminobenzoic acids, amino-organobenzene organoacids, organo-aminobenzene organoacids, organo-amino-organobenzoic acids, and organo-amino-organobenzene organoacids), (organo)amino(organo)cyclohexane (organo)acids (including aminocyclohexane acids, aminocyclohexane organoacids, amino-organocyclohexane acids, organo-aminocyclohexane acids, amino-organocyclohexane organoacids, organo-aminocyclohexane organoacids, organo-amino-organocyclohexane acids, and organo-amino-organocyclohexane organoacids), and their respective esters (such as methyl esters, ethyl esters, propyl esters, isopropyl esters, butyl esters, isobutyl esters, t-butyl esters, pentyl esters, hexyl esters, and other linear and branched alkyl esters known to one skilled in the art), with one or more compounds having two or more active hydrogen functionalities (e.g., the various amine- and/or hydroxy-functional compounds and telechelics disclosed herein). Active hydrogen functional compounds can be chosen from alkanediols, alkanetriols, polyalkanediols, dihydroxy telechelics, and trihydroxy telechelics, such as those disclosed herein. Mechanisms of the condensation/transesterification reactions can be:

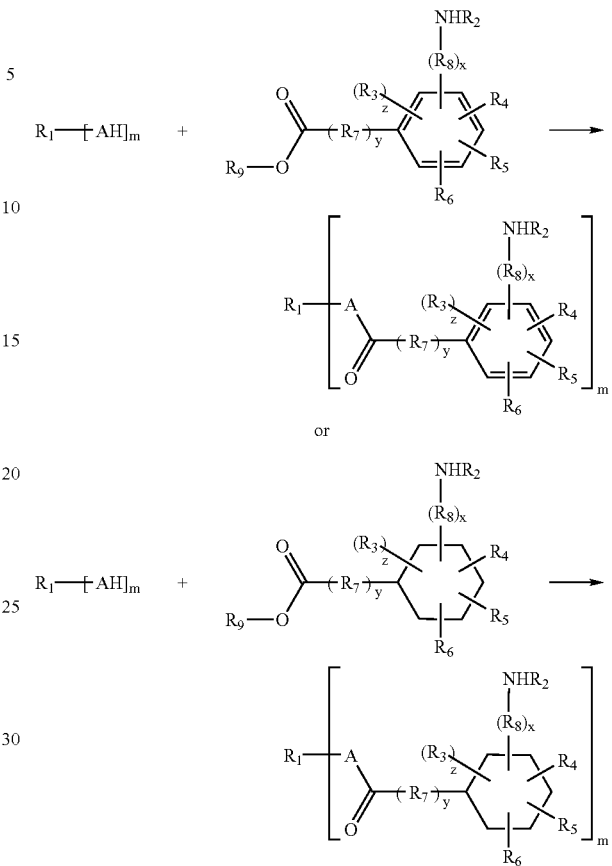

where $-(R_8)_x-NHR_2$ and $-(R_7)_y-COOR_9$ are ortho, meta, or para substituents on the cyclic rings; A is the same or different moieties chosen from O, S, and NR, R being hydrogen or organic moieties having about 1-20 carbon atoms, such as 1-12 carbon atoms; $R_1$ is a divalent or polyvalent organic moiety having at least one carbon or silicon atom, such as about 1,000 carbon or silicon atoms or less; $R_2$ is hydrogen or organic moiety having 1 to about 20 carbon atoms, such as 1-6 carbon atoms; $R_3$ to $R_6$ are independently chosen from hydrogen, halides, nitro, and organic moieties having about 1-20 carbon atoms, such as about 1-6 carbon atoms; $R_7$ is an organic moiety having at least one C, O, N, S, or Si atom, such as a divalent, linear or branched organic moiety having about 60 carbon atoms or less, or about 20 carbon atoms or less; $R_8$ is a divalent organic moiety having one carbon atom connecting $NHR_2$ to the cyclic ring, such as $-CH_2-$, $-CH(CH_3)-$, $-CH(CH_2CH_3)-$, or $-C(CH_3)_2-$; $R_9$ is chosen from hydrogen and organic moieties having about 1-20 carbon atoms, such as about 1-12 carbon atoms; m is at least 1, such as about 2-10, like 2, 3, 4, and any numbers therebetween; x, y, and z are independently 0 or 1. One or more of R, $R_1$ to $R_6$ and $R_9$ can have one or more heteroatoms chosen from O, N, S, and Si.

$R_1$ can be linear or branched, divalent or trivalent, substituted (such as halogenated) or unsubstituted, aliphatic, cyclic, alicyclic, aromatic, or araliphatic, include alkylene moieties having about 1-60, about 1-20, or about 1-12 carbon atoms, such as methylene, ethylene, propylene, butylene, pentylene, hexylene, heptylene, octylene, nonylene, decylene, undecylene, and dodecylene moieties. $R_9$ can be linear or branched, substituted (such as halogenated) or unsubstituted, aliphatic, cyclic, alicyclic, aromatic, or araliphatic, include alkyl moieties such as methyl, ethyl, propyl, isopropyl, butyl, sec-butyl, tert-butyl, pentyl, hexyl, cyclohexyl, heptyl, octyl, nonyl, decyl, undecyl, and dodecyl.

Non-limiting examples of suitable aromatic amino acids and esters thereof include 2-aminobenzoic acid, 2-amino-(3, 4, 5, or 6)-methylbenzoic acid, 5-nitro anthranilic acid, 2-amino-(3 or 5)-hydroxybenzoic acid, 2-amino-(3, 4, 5, or 6)-chlorobenzoic acid, 2-amino-6-bromo-5-methylbenzoic acid, 2-amino-phenylacetic acid, 2-amino-3-benzoylphenylacetic acid, 2-amino-3-(4-bromobenzoyl)phenylacetic acid, 3-aminobenzoic acid, 3-amino-4-methylbenzoic acid, 3-amino-4-methoxybenzoic acid, 3-amino-(2, 4, or 6)-chlorobenzoic acid, 3-amino-phenylacetic acid, methyl-2-aminobenzoate, methyl-2-amino-5-bromobenzoate, methyl-2-amino-3,5-dibromobenzoate, ethyl-2-aminobenzoate, pentyl-2-aminobenzoate, 2-propenyl-2-aminobenzoate, cyclohexyl-2-aminobenzoate, methyl-2-methylaminobenzoate, methyl-2-methylaminobenzoate, sec-butyl-2-methylaminobenzoate, methyl-3-aminobenzoate, methyl-3-amino-4-methylbenzoate, methyl-3-amino-4-methoxybenzoate, ethyl-3-aminobenzoate, and mixtures thereof. Illustrative examples of cyclohexane analogs to the aminobenzoic acids include, but are not limited to, 2-aminomethyl-cyclohexane carboxylic acid and 3-aminomethyl-cyclcohexane carboxylic acid.

Sterically hindered polyamines can be obtained by reacting the active hydrogen functional compound or telechelic with a substituted or unsubstituted oxazine dione (e.g., anhydrides), such as a benzoxazine dione or cyclohexane oxazine dione having the generic structures of:

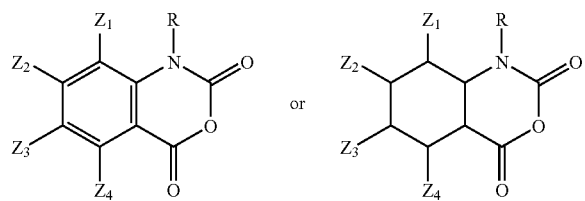

where R is chosen from hydrogen and organic moieties having about 1-20 carbon atoms, such as about 1-6 carbon atoms; $Z_1$ to $Z_4$ are independently chosen from hydrogen, halides, nitro groups, and organic moieties having about 1-20 carbon atoms, such as about 1-6 carbon atoms. One or more of R and $Z_1$ to $Z_4$ may contain one or more heteroatoms such as O, N, S, or Si, and/or may be partially or fully halogenated. Non-limiting examples include isatoic anhydride, N-methyl isatoic anhydride, 5-nitro-isatoic anhydride, 3-methyl-benzoxazine-2,4-dione, 3-phenyl-1,3-benzoxazine-2,4-dione, 3-(4-methylphenyl)-1,3-benzoxazine-2,4-dione, 1-[3-(perfluorooctyl)propyl]-(1H-benzo[d][1,3]oxazine-2,4-dione (F-Isatoic Anhydride available from Fluorous Technologies, Inc. of Pittsburgh, Pa.), and mixtures thereof.

The various reaction themes described above for preparing sterically hindered polyamines can be applied to other cyclic analogs where the benzene or cyclohexane rings of the reactants and reaction products are replaced by other saturated or unsaturated 4-membered or larger cyclic structures, including monocyclics, polycyclics (fused, spiro, and/or bridged), and heterocyclics, such as cyclopentane. In the case of saturated cyclic structures, the at least one amine-containing substitution and the at least one acid/ester-containing substitution may be directly attached to the same ring-member carbon atom, as in the case of 1-aminocyclopentane carboxylic acid.

The sterically hindered polyamines can further be prepared by reacting the amino acids or esters mentioned above with diamines and polyamines disclosed herein, such as alkanediamines, alkanetriamines, and the various polyamine telechelics. In this case, the reaction forms two or more amide linkages rather than ester linkages.

Hydrazine and hydrocarbyl-substituted hydrazine may also be used as polyamines. At least one of the nitrogen atoms in the hydrazine may directly bond to at least one hydrogen. There can be at least two hydrogen atoms bonded directly to hydrazine nitrogen, and both hydrogen atoms can be on the same nitrogen. Non-limiting examples of substituted hydrazines are methylhydrazine, N,N-dimethyl hydrazine, N,N'-dimethyl hydrazine, phenylhydrazine, N-phenyl-N'-ethylhydrazine, N-(p-tolyl)-N'-(n-butyl)-hydrazine, N-(para-nitrophenyl)-hydrazine, N-(para-nitrophenyl)-N-methylhydrazine, N,N'-di(p-chlorophenyl)-hydrazine, and N-phenyl-N'-cyclohexylhydrazine.

Any polyol telechelics available or known to one of ordinary skill in the art are suitable for use in compositions of the disclosure. Polyol telechelic such as α,ω-dihydroxy telechelics, include polyol polyhydrocarbons (such as polyol polyolefins), polyol polyethers, polyol polyesters (such as polyol polycaprolactones), polyol polyamides (such as polyol polycaprolactams), polyol polycarbonates, polyol polyacrylates (such as polyol polyalkylacrylates), polyol polysiloxanes, polyol polyimines, polyol polyimides, and polyol copolymers including polyol polyolefinsiloxanes (such as α,ω-dihydroxy poly(butadiene-dimethylsiloxane) and α,ω-dihydroxy poly(isobutylene-dimethylsiloxane)), polyol polyetherolefins (such as α,ω-dihydroxy poly(butadiene-oxyethylene)), polyol polyetheresters, polyol polyethercarbonates, polyol polyetheramides, polyol polyetheracrylates, polyol polyethersiloxanes, polyol polyesterolefins (such as α,ω-dihydroxy poly(butadiene-caprolactone) and α,ω-dihydroxy poly(isobutylene-caprolactone)), polyol polyesteramides, polyol polyestercarbonates, polyol polyesteracrylates, polyol polyestersiloxanes, polyol polyamideolefins, polyol polyamidecarbonates, polyol polyamideacrylates, polyol polyamidesiloxanes, polyol polyamideimides, polyol polycarbonateolefins, polyol polycarbonateacrylates, polyol polycarbonatesiloxanes, polyol polyacrylateolefins (such as α,ω-dihydroxy poly(butadiene-methyl methacrylate), α,ω-dihydroxy poly(isobutylene-t-butyl methacrylate), and α,ω-dihydroxy poly(methyl methacrylate-butadiene-methyl methacrylate)), polyol polyacrylatesiloxanes, polyol polyetheresteramides, any other polyol copolymers, as well as blends thereof. Other polyol telechelics can be derived from polyacid telechelics through reaction with polyols, aminoalcohols, and/or cyclic ethers, or derived from polyamine telechelics through reaction with hydroxy acids, cyclic esters, and/or cyclic ethers as disclosed herein.

The molecular weight of the polyol telechelics can be about 100-20,000, such as about 200, about 230, about 500, about 600, about 1,000, about 1,500, about 2,000, about 2,500, about 3,000, about 3,500, about 4,000, about 5,000, about 8,000, about 10,000, or any number therebetween. The polyol telechelics can have one or more hydrophobic and/or hydrophilic segments. Suitable polyol telechelics, including generic structures and specific examples, are disclosed in parent application bearing Ser. No. 10/859,557 and Publication No. US 2004-0220378 A1, the entirety of which is incorporated by express reference herein.

Polyols include, but are not limited to, unsaturated diols such as 1,3-bis(2-hydroxyethoxy) benzene, 1,3-bis[2-(2-hydroxyethoxy)ethoxy]benzene, N,N-bis(β-hydroxypropyl) aniline, 1,3-bis {2-[2-(2-hydroxyethoxy)ethoxy] ethoxy}benzene, hydroquinone-di(β-hydroxyethyl)ether, resorcinol-di(β-hydroxyethyl)ether; saturated diols such as ethylene glycol, diethylene glycol, polyethylene glycol, propylene glycol, dipropylene glycol, polypropylene glycol, 2-methyl-1,3-propanediol, 1,2-, 1,3-, 1,4-, or 2,3-butanediols, 2-methyl-1,4-butanediol, 2,3-dimethyl-2,3-butanediol, 1,5-pentanediol, 1,6-hexanediol, dimethylolcyclohexane, 1,3-bis(2-hydroxyethoxy)cyclohexane, 1,3-bis[2-(2-hydroxyethoxy)ethoxy]cyclohexane, 1,3-bis {2-[2-(2-hydroxyethoxy)ethoxy]ethoxy}cyclohexane; unsaturated triols such as castor oil (i.e., triricinoleoyl glycerol); saturated triols such as 1,2,4-butanetriol, 1,2,6-hexanetriol, trimethylolethane (i.e., 1,1,1-tri(hydroxymethyl)ethane), trimethylolpropane (i.e., 2,2-di(hydroxymethyl)-1-butanol), triethanolamine, triisopropanolamine; unsaturated tetraols such as 2,4,6-tris(N-methyl-N-hydroxymethyl-aminomethyl)phenyl; saturated tetraols such as pentaerythritol (i.e., tetramethylolmethane), tetrahydroxypropylene ethylenediamine (i.e., N,N,N',N'-tetrakis(2-hydroxypropyl)-ethylenediamine); and other polyols such as mannitol (i.e., 1,2,3,4,5,6-hexanehexyl) and sorbitol (an enantiomer of mannitol) (both saturated).

The polyols can be alkanediols such as, without limitation, ethylene glycol, 1-phenyl-1,2-ethanediol, 1,2- or 1,3-propanediol, 3-chloro-1,2-propanediol, 2-methyl-1,3-propanediol, 2-ethyl-2-methyl-1,3-propanediol, 2,2-dimethyl-1,3-propanediol, 2,2-diphenyl-1,3-propanediol, 2-n-butyl-2-ethyl-1,3-propanediol, 1,3-, 1,4-, or 2,3-butanediol, 2-methyl-1,4-butanediol, 1,1,4,4-tetraphenyl-1,4-butanediol, 2,2,4,4,-tetramethyl-1,3-cyclobutanediol, 1,5- or 2,4-pentanediol, 2-methyl-2,4-pentanediol, 1,6- or 2,5-hexanediol, 2-ethyl-1,3-hexnaediol, 2,5-dimethyl-2,5-hexanediol, 1,4-cyclohexanediol, 1,7-heptanediol, 1,8-octanediol, 1,12-dodecanediol, hydroquinone di(b-hydroxyethyl)ether, hydroquinone di(b-hydroxypropyl) ether, resorcinol di(b-hydroxyethyl)ether, resorcinol di(b-hydroxypropyl)ether, 2,2-bis(4-hydroxyphenyl)propane, and mixtures thereof. Fatty polyols include fatty diols and fatty triols such as 1,9,10-trihydroxyoctadecane.

The polyol may have a structure of:

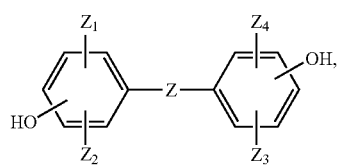

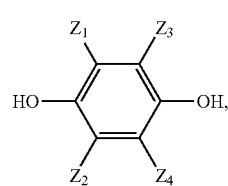

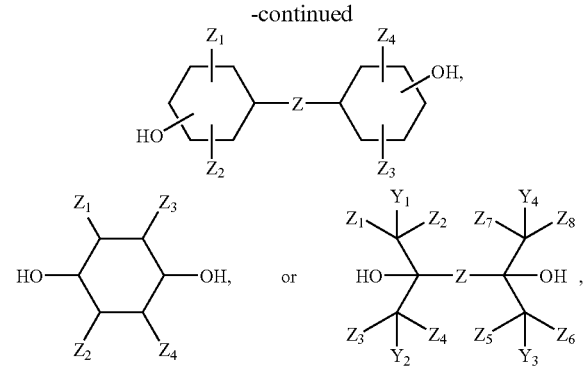

where $Z_1$ to $Z_8$ are independently chosen from halogenated or non-halogenated hydrocarbon moieties having about 1-20 carbon atoms, halogenated or non-halogenated organic moieties having at least one O, N, S, or Si atom and zero to about 12 carbon atoms, or halogens; $Y_1$ to $Y_4$ are independently chosen from hydrogen, halogenated or non-halogenated hydrocarbon moieties having about 1-20 carbon atoms, halogenated or non-halogenated organic moieties having at least one O, N, S, or Si atom and zero to about 12 carbon atoms, and halogens; Z is halogenated or non-halogenated hydrocarbon moieties having about 1-60 carbon atoms, or halogenated or non-halogenated organic moieties having at least one O, N, S, or Si atom and zero to about 60 carbon atoms. Z can have one of the structures (41)-(48) above. Other non-limiting examples include 1,4-durene diol and 2,3,5,6-tetramethyl-1,4-dihydroxycyclohexane.

As used herein, the term "aminoalcohol telechelic" refers to telechelic polymers having at least one terminal amine end-group and at least one terminal hydroxyl end-group. Any such aminoalcohol telechelics available to one of ordinary skill in the art are suitable for use in compositions of the present disclosure. These telechelics can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric, and include homopolymers, random copolymers, pseudo-copolymers, statistical copolymers, alternating copolymers, periodic copolymer, bipolymers, terpolymers, quaterpolymers, as well as derivatives of any and all polyamine telechelics, polyol telechelics, and polyacids disclosed herein. Aminoalcohol telechelics can have any of the polymer or copolymer structures of the herein-described polyamine telechelics and polyol telechelics, such as polyhydrocarbons (such as polydienes), polyethers, polyesters (such as polycaprolactones), polyamides (such as polycaprolactams), polycarbonates, polyacrylates (such as polyalkylacrylates), polysiloxanes, and copolymers thereof. Suitable aminoalcohol telechelics, including generic structures and specific examples, are disclosed in parent application bearing Ser. No. 10/859,557 and Publication No. US 2004-0220378 A1, the entirety of which is incorporated by express reference herein.

Aminoalcohols useful in the present disclosure include any and all monomers, oligomers, and polymers having at least one free isocyanate-reactive hydroxy group and at least one free isocyanate-reactive amine group. The hydroxy and amine groups may be primary or secondary, terminal or pendant groups on the oligomeric or polymeric backbone, and in the case of secondary or tertiary amine groups, may be embedded within the backbone. Aminoalcohols can be linear or branched, saturated or unsaturated, aliphatic, alicyclic, aromatic, or heterocyclic. The aminoalcohol can be R—[HN—(R'O)$_x$]$_y$—H, where R is hydrogen, hydrocarbyl or hydroxyhydrocarbyl group (such as —R'—OH) having about 1-12 carbon atoms, such as about 1-8 or about 1-4 carbon atoms; R' is a divalent hydrocarbyl moiety having about 2-30 carbon atoms; each x is independently about 1-15; and y is about 1-3. R and R' can independently be acyclic, alicyclic or aromatic. These aminoalcohols include alkanolamines, N-(hydroxyhydrocarbyl)amines, hydroxypoly(hydrocarbyloxy)amines, and hydroxypoly(hydroxyl-substituted oxyalkylene)amines, conveniently prepared by reaction of one or more epoxides with amines, and are also known as alkoxylated amines (when y is 1) or diamines (when y is 2).

R' can be linear or branched alkylene having about 2-30 carbon atoms, such as about 4 or 6 carbon atoms or any number therebetween, like ethylene, propylene, 1,2-butylene, 1,2-octadecylene, etc. R can be methyl, ethyl, propyl, butyl, pentyl, or hexyl group. Non-limiting examples of these alkanolamines include monoethanolamine, diethanolamine, diethylethanolamine, ethylethanolamine, monoisopropanolamine, diisopropanolamine, butyldiethanolamine, etc. Non-limiting examples of hydroxyhydrocarbylamines include 2-hydroxyethylhexylamine, 2-hydroxyethyloctylamine, 2-hydroxyethylpentadecylamine, 2-hydroxyethyloleylamine, 2-hydroxyethylsoyamine, 2-hydroxyethoxyethylhexylamine, and mixtures thereof.

The aminoalcohol can be hydroxy-containing polyamine, such as analogs of hydroxy monoamines, like alkoxylated alkylenepolyamines (e.g., N,N-(diethanol)ethylene diamines). Such polyaminoalcohols can be prepared by reacting one or more cyclic ethers such as those disclosed herein with the diamines and higher polyamines disclosed herein, such as alkylene polyamines, or with the various aminoalcohols, such as those disclosed herein, including primary, secondary, and tertiary alkanolamines, with a molar ratio of about 1:1 to about 2:1. Reactant ratios and temperatures for carrying out such reactions are known to those skilled in the art. Specific examples of hydroxy-containing polyamines include N-(2-hydroxyethyl)ethylenediamine, N,N'-bis(2-hydroxyethyl)ethylenediamine, 1-(2-hydroxyethyl)piperazine, mono(hydroxypropyl)-substituted tetraethylenepentamine, N-(3-hydroxybutyl)-tetramethylene diamine, etc. Higher homologs obtained by condensation of the above-illustrated hydroxy-containing polyamines through amine and/or hydroxyl groups are likewise useful. Condensation through amine groups can result in a higher amine accompanied by removal of ammonia while condensation through the hydroxyl groups can result in products containing ether linkages accompanied by removal of water.

Other examples of aminoalcohols include N-(2-hydroxyethyl)cyclohexylamine, 3-hydroxycyclopentylamine, parahydroxyaniline, 2-propanol-1,1'-phenylaminobis, N-hydroxyethylpiperazine, 2-aminoethanol, 3-amino-1-propanol, 1-amino-2-propanol, 2-(2-aminoethoxy)ethanol, 2-[(2-aminoethyl)amino]ethanol, 2-methylaminoethanol, 2-(ethylamino)ethanol, 2-butylaminoethanol, diethanolamine, 3-[(hydroxyethyl)amino]-1-propanol, diisopropanolamine, bis(hydroxyethyl)-aminoethylamine, bis(hydroxypropyl)-aminoethylamine, bis(hydroxyethyl)-aminopropylamine, bis(hydroxypropyl)-aminopropylamine, hydroxy-functional amino acids as described herein, and mixtures thereof.

As used herein, the term "polyacids" encompasses diacids, triacids, tetracids, other higher acids, as well as acid anhydrides, dianhydrides, chlorides, esters, dimers, trimers, oligomers, polymers, and any other structures capable of forming at least two ester or amide linkages. Suitable organic polyacids include, but are not limited to, organic monomeric diacids having about 2-60 carbon atoms, such as branched or linear aliphatic dicarboxylic acids having about 2-44 carbon atoms, alkane dicarboxylic acids having about 6-22 carbon atoms, cyclic or cycloaliphatic dicarboxylic acids having about 6-44 carbon atoms, aromatic dicarboxylic acids having about 8-44 carbon atoms, and fatty polyacids. The polyacids can be aliphatic dicarboxylic acids and alicyclic dicarboxylic acids having para-, meta- and/or ortho-positioned dicarboxylic acid moieties. Suitable polyacids, including generic structures and specific examples, are disclosed in parent application bearing Ser. No. 10/859,557 and Publication No. US 2004-0220378 A1, the entirety of which is incorporated by express reference herein.

Chemicals suitable for use in the compositions of the present disclosure also include fatty acids, amino acids, hydroxyl acids, cyclic ethers, cyclic esters, cyclic amides, and other cyclic compounds. Examples of such chemicals are disclosed in parent application bearing Ser. No. 10/859,557 and Publication No. US 2004-0220378 A1, the entirety of which is incorporated by express reference herein.

Any one or blend of two or more isocyanate-functional compounds available to one of ordinary skill in the art may be suitable for use in compositions of the present disclosure. Isocyanate-functional compounds can be organic isocyanates in general, and may have an isocyanate functionality of about 1 (i.e., monoisocyanates), such as about 2 or greater (i.e., polyisocyanates). Polyisocyanates for use according to the disclosure can include monomers, dimers (such as uretdiones of identical polyisocyanates and isocyanate derivatives of dimer acids or dimer amines), trimers (such as isocyanurates of identical or different polyisocyanates, isocyanates of trimer acids or trimer amines), tetramers, oligomers (of same or different monomers, or isocyanate derivatives of oligomer polyacids or oligomer polyamines), adducts (such as uretdiones of different polyisocyanates and isocyanate derivatives of adduct polyacids or adduct polyamines), polymers (such as isocyanate derivatives of polymer polyacids or polymer polyamines), polyisocyanate-terminated prepolymers, low-free-isocyanate prepolymers, quasi-prepolymers, isomers thereof, modified derivatives thereof, and combinations thereof. Structure of the isocyanate reactant can partially or fully be substituted, unsubstituted, saturated, unsaturated, hydrogenated, aliphatic, alicyclic, cyclic, polycyclic, aromatic, araliphatic, heteroaliphatic, and/or heterocyclic.

Suitable polyisocyanates may have the generic structure of R(NCO)$_n$, where n is about 2-4; R comprises one or more linear or branched, substituted or unsubstituted, saturated or unsaturated moieties having about 2-60 carbon atoms, such as aliphatic moieties of about 4-30 or about 6-20 carbon atoms, cyclic or alicyclic moieties of about 6-40 or about 6-30 carbon atoms, aromatic or araliphatic moieties of about 6-30 or about 6-18 carbon atoms, and mixtures thereof. When multiple cyclic or aromatic moieties are present, linear and/or branched aliphatic hydrocarbon moieties having about 1-20 or about 1-10 carbon atoms can be present as spacers separating adjacent ring structures. The cyclic or aromatic moieties may be substituted at 2-, 3-, 4- and/or other available positions. Any available hydrogen atoms in the polyisocyanate can also be substituted. Substituent moieties include, but are not limited to, linear or branched aliphatic hydrocarbons; halogens; organic moieties having one or more heteroatoms such as N, O, S, P, and/or Si (e.g., cyano, amine, silyl, hydroxyl, acid, ether, ester, etc.); or a mixture (such as isomeric or racemic mixtures) thereof. Also included are, for example, oligoisocyanates and polyisocyanates which can be prepared from the diisocyanates or triisocyanates listed or mixtures thereof by coupling by means of urethane, allophanate, urea, biuret, uretdione, amide, isocyanurate, carbodiimide, uretonimine, oxadiazinetrione, and/or iminooxadiazinedione structures.

Polyisocyanates also include, without limitation, polymeric polyisocyanates and modified polyisocyanates, distillation residues containing isocyanate groups that are formed in the commercial preparation of isocyanates, sterically hindered polyisocyanates, regioselective polyisocyanate, fatty polyisocyanates.

Any and all of the compounds having two or more isocyanate-reactive functionalities as disclosed herein may be used as curatives to cure prepolymers into thermoplastic or thermoset compositions. These curatives can be polyamines, polyols, aminoalcohols, polyamine telechelics, and polyol telechelics, and aminoalcohol telechelics. To further improve the shear resistance of the resulting elastomers, trifunctional curatives, tetrafunctional curatives, and higher functionality curatives can be used to increase crosslink density. Other curatives include those disclosed in U.S. Pat. No. 4,808,691, from column 9, line 24 to column 12, line 16, in U.S. Pat. No. 5,484,870, from column 2, line 47 to column 3, line 41, which are incorporated herein by reference.

The curative can be a modified curative blend as disclosed in co-pending U.S. Patent Publication No. 2003/0212240, bearing Ser. No. 10/339,603, which is incorporated by reference herein in its entirety. For example, the curative may be modified with a freezing point depressing agent to create a curative blend having a slow onset of solidification and storage-stable pigment dispersion. A number of curatives have relatively high freezing points, e.g., hexamethylene diamine (105.8° F.), diethanolamine (82.4° F.), triethanolamine (69.8° F.), diisopropanolamine (73.4° F.), and triisopropanolamine (111.2° F.). Such curatives may be blended with one or more amine-based freezing point depressing agents such as, without limitation, ethylene diamine, 1,3-diaminopropane, dimethylaminopropylamine, tetraethylene pentamine, 1,2-propylenediamine, diethylamino-propylamine, 2,2,4-trimethyl-1,6-hexanediamine, and 2,4,4-trimethyl-1,6-hexanediamine.

The freezing point depressing agent can be added in an amount sufficient to reduce the freezing point of the curative blend by a suitable amount to prevent loss of pigment dispersion, but not adversely affect the physical properties of the resulting golf ball, such as about 5% by weight or greater of the total blend, about 8%, about 10%, about 12%, about 14%, or any amount therebetween or even greater. After freezing and subsequent thawing, the modified curative blend can have a pigment dispersion of greater than 0 on the Hegman scale, such as about 1, about 2, about 3, about 4, about 5, about 6, about 7, or some level therebetween or even greater.

Curatives comprising one or more ethylenic and/or acetylenic unsaturation moieties can be used to incorporate these moieties into the resulting material for subsequent crosslinking, as described herein below. Such unsaturated moieties include allyl groups and $\alpha,\beta$-ethylenically unsaturated $C_3$ to $C_8$ carboxylate groups. Non-limiting examples of curatives comprising allyl groups include trimethylolpropane monoallyl ether, N-methylolacrylamide, glyceryl-$\alpha$-allyl ether, 1,1-dihydroxymethylcyclohex-3-ene, 1,2-dihydroxymethylcyclohex-4-ene, and the like. Curatives comprising (meth) acryloyl groups include esters of (meth)acrylic acids with diols or polyols. Non-limiting examples include 2-hydroxyethyl, 2- or 3-hydroxypropyl or 2-, 3- or 4-hydroxybutyl (meth)acrylates and mixtures thereof. Monools comprising (meth)acryloyl groups or reaction products substantially composed of such alcohols that are obtained by esterification of n-hydric alcohols with (meth)acrylic acid are suitable. Mixtures of various alcohols can be used, such that n stands for an integer or a statistical average of greater than about 2 to about 10, preferably about 2 to about 4, and more preferably about 3. Per mole of the polyols mentioned, (n–0.6) to (n–2.2), (n–0.8) to (n–1.2), or (n–1) moles of (meth)acrylic acids can be used. These compounds or product mixtures include the reaction products of:

(i) triols such as glycerol, trimethylolpropane and/or pentaerythritol; low-molecular-weight alkoxylation products of such alcohols (e.g., ethoxylated or propoxylated trimethylolpropane more specifically the addition product of ethylene oxide to trimethylolpropane having an OH number of 550); or mixtures of at least triols with diols (e.g., ethylene glycol or propylene glycol), and (ii) (meth)acrylic acid in the stated molar ratio. Said compounds have a molecular weight of 116 to 1000, such as 116 to 750 or 116 to 158.

Furthermore, the reaction products of said monols comprising (meth)acryloyl groups with, for example, ε-caprolactone can also be used. Such products can be obtained, for example, as Tone® M-100, M-101, and M-201 monomers from Dow Chemical. These compounds have a molecular weight of 230 to 3000, such as 230 to 1206 or 344 to 572.

(Meth)acryloyl alcohols also include urethane (meth) acrylates that contain (meth)acryloyl groups and free hydroxyl groups, such as reaction products of urethane (meth)acrylates with diols, optionally mixed with polyols. Aliphatic, cycloaliphatic and/or aromatic diols can be used as diols, for example ethylene glycol, the isomeric propanediols, butanediols, pentanediols, hexanediols, heptanediols, octanediols, nonanediols and cyclohexanedimethanol, hydrogenated bisphenyl-A and derivatives of the above mentioned diols substituted with one or more $C_1$-$C_6$-alkyl groups. Also suitable are diols containing ester groups, ether groups such as (3-hydroxy-2,2-dimethylpropyl)-3-hydroxy-2,2-dimethylpropionate or diethylene glycol, dipropylene glycol, and tripropylene glycol. Non-limiting examples are neopentyl glycol, 2,2-dimethyl-1,3-propanediol, 2-ethyl-1,3-hexanediol, 2,5-dimethyl-1,6-hexanediol, 2,2,4-trimethyl-1,3-pentanediol, and 3-hydroxy-2,2-dimethylpropyl 3-hydroxy-2,2-dimethylpropionate. The diols may also be used in the form of their alkoxylation products (ethylene oxide, propylene oxide, and $C_4$-ether units). The use of polyester diols is also possible. These include the reaction products of dicarboxylic acids and/or their anhydrides, ethylenically unsaturated dicarboxylic acids and/or their anhydrides, and lactones (such as ε-caprolactone) with the above mentioned diols. Also suitable is cc,co-dihydroxypolyacrylates (for example, Tegomer® BD 1000 from Goldschmidt).

The compositions of the disclosure may comprise at least one polyurea formed from the well-known one-shot method or prepolymer method. In the latter, polyamine telechelic is reacted with excess polyisocyanate to form polyurea prepolymer, which is then reacted with curative to form the polyurea. Prepolymer to curative ratio can be as high as 1:0.9 or 1:0.95, such as when primary polyamine curatives are used, or as low as 1:1.1 or 1:1.05, such as 1:1.02, such as when secondary polyamine curatives are used. Curative includes polyamines, polyols, polyacids, aminoalcohols, aminoacids, and hydroxy acids, especially those disclosed herein, as well as epoxy-functional reactants, thio-containing reactants, and any other isocyanate-reactive compounds and materials. The polyurea composition can be castable, thermoplastic, thermoset, or millable.

The content of reactable isocyanate moieties in the polyurea prepolymer, expressed as % NCO by weight, can be manipulated to control such factors as curing rate, hardness of the resulting material, and the like. All else being the same, the hardness of the resulting material can increase as the % NCO of the prepolymer increases, and can be greater in polyamine cured compositions than in polyol cured compositions. The polyurea prepolymer can be low-melting (such as being fluid at about 125° C.) or fluid at ambient temperature. The % NCO by weight in the prepolymer can be less than about 30%, such as about 15%, about 11%, about 9%, about 7%, or even less, or at least about 2%, such as about 3% or about 4% or greater, or any percentage therebetween, such as about 5-11%, about 6-9.5%, about 3-9%, about 2.5-7.5%, or about 4-6.8%.

In forming the polyurea prepolymer, polyamine telechelics as disclosed herein can be used alone or in combination of two or more thereof to react with excess isocyanate. Prepolymers with higher % NCO (e.g., 14%) can be converted to prepolymers with lower % NCO (e.g., 10%) by further reacting with one or more other polyamines, polyols, polyamine telechelics, and/or polyol telechelics (e.g., polyamine polyamides, polyol polysiloxanes). The polyamine telechelic can have one amide linkage, two amide linkages, one or more segments having multiple amide linkages, or a polyamide backbone. When a plurality of amide linkages is present, one or more of them can conjoin consecutive repeating units or alternating repeating units. Polyurea prepolymers may contain a content of free isocyanate monomers by about 10% and up to about 20% of the total weight, which can be stripped down to about 1% or less, such as about 0.5% or less.

When forming a saturated prepolymer, such as for use in highly light-stable compositions, saturated polyisocyanates being aliphatic, alicyclic, and/or heteroaliphatic can be used alone or in combinations of two or more thereof. Araliphatic polyisocyanates, alone or in mixtures of two or more thereof, may also be used to form relatively light-stable materials. Without being bound to any particular theory, it is believed that the direct attachment of the NCO moieties to aliphatic side chains without conjugation with the aromatic rings prevents the araliphatic polyisocyanates from, or diminishes their ability in, forming extended conjugated double bonds, which may give rise to discoloration (e.g., yellowing). The sterically hindered polyisocyanates are useful in forming highly or relatively light-stable materials. Without being bound to any particular theory, it is believed that the steric hinderance around the N atom tends to rotate it out of plane, thereby reducing its absorbance of UV wavelengths and achieving desired light-stability. Moreover, one or more of the NCO groups in the sterically hindered polyisocyanates can be attached to tertiary or quaternary carbon atoms that are substantially free of C—H bonds, thus eliminating or reducing the occurrence of UV-induced oxidation at the carbon atoms, and in turn slowing degradation or discoloration. The saturated polyisocyanates, the araliphatic polyisocyanates, and the sterically hindered polyisocyanates may be used alone or in any combinations of two or more thereof.

The compositions of the disclosure may comprise at least one polyurethane, such as the reaction product of at least one polyurethane prepolymer and at least one curative, of which the polyurethane prepolymer is the reaction product of at least one polyol telechelic and at least one polyisocyanate. Prepolymer to curative ratio can be 1:0.9 to 1:1.1, such as 1:0.95, 1:1.05, or 1:1.02. One or more of the polyol telechelic, the polyisocyanate, and the curative can be chosen from those disclosed herein, can be saturated, and the resulting polyurethane can be saturated. Polyurethane prepolymers can have free isocyanate monomers by about 10% and up to about 20% of the total weight, which can be stripped down to about 1% or less, such as about 0.5% or less.

The polyurethane composition can be castable, thermoplastic, thermoset, or millable. The % NCO by weight in the prepolymer can be less than about 30%, such as about 15%, about 11%, about 9%, about 7%, or even less, or at least about 2%, such as about 3% or about 4% or greater, or any percentage therebetween, such as about 5-11%, about 6-9.5%, about 3-9%, about 2.5-7.5%, or about 4-6.8%. In forming the polyurethane prepolymer, polyol telechelics as disclosed herein can be used alone or in combination of two or more thereof to react with excess isocyanate. Prepolymers with higher % NCO (e.g., 14%) can be converted to prepolymers with lower % NCO (e.g., 10%) by further reacting with one or more other polyamines, polyols, polyamine telechelics, and/or polyol telechelics (e.g., polyamine polyamides, polyol polysiloxanes). The polyol telechelic can have one or two amide linkages, one or more segments having multiple amide linkages, or a polyamide backbone. When a plurality of amide linkages is present, one or more of them can conjoin consecutive repeating units or alternating repeating units.

Crosslinkable polyurethanes can be formed from polyol telechelics, curatives, and stoichiometrically deficient amounts of polyisocyanate such as diisocyanate. Any one or more the reactants can have one or more aliphatic, non-benzenoid >C═C< moieties for crosslinking. Such polyurethanes can have rubber elasticity and wear resistance and strength, and can be millable. Polyol telechelics of low crystallizability, such as those having linear or branched side chains and those formed by random copolymerization (e.g. polyol polyethers, polyol polyesters, polyol polyetheresters, and others as disclosed herein), can be used to form such polyurethanes. Non-limiting examples include polyethylene propylene adipate polyols, polyethylene butylene adipate polyols, polytetramethylene ether glycols (such as those having $M_w$ of about 2,000), tetrahydrofuran (THF)-alkyl glycidyl ether random copolymers, and other polyol polyesters based on adipic acid and diols like ethanediol, butanediol, methylpropanediol, hexanediol. Polyol telechelics can be incorporated with ethylenic and/or acetylenic unsaturation moieties as disclosed above, such as by reacting them with α,β-ethylenically unsaturated carboxylic acids, and then crosslinked using vulcanizing agents such as those disclose herein. Alternatively, the polyurethanes are substantially free of ethylenic unsaturation moieties.

Formulations comprising such polyurethane materials and optional additives such as vulcanizing agents, fillers, plasticizers, light stabilizers, and others as disclosed herein, can form golf ball portions such as cover layers by extrusion, transfer molding, compression molding, and/or injection molding. Hemispherical cup can be preformed by compression molding at ambient temperature. The cup halves can then be compression molded over subassemblies such as cores into inner cover layer or dimpled outer cover layer at elevated temperature (e.g., 320° F.) and under increased pressure (e.g., 800 psi), during which the formulation is crosslinked. After a period of time (e.g., 2.5 minutes) the molds are cooled (e.g., 10 minutes with tap water or 1 minute with tap water and then 4 minutes with chilled water) and the molded objects are released from the molds.

Properties of crosslinkable polyurethanes include Mooney viscosity at 100° C. of 40-70 (e.g., 50, 60, 65, or therebetween), tensile strength of 2,000-6,000 psi (e.g., 3,000 psi, 4,000 psi, 5,000 psi, or therebetween), tear strength of 300-600 lb/in (e.g., 400 lb/in, 500, lb/in, or therebetween), brittle point of −70° F. or lower (e.g., −80° F., −90° F., or lower), material hardness of 25 Shore A to 60 Shore D (e.g., 55 Shore D), elongation at break of 100-700% (e.g., 300%, 400%, 500%, 600%, or therebetween), Bashore rebound of 40-70% (45%, 55%, or therebetween), and abrasion index (ASTM D-1630) of 300 or greater. Other crosslinkable compositions and components thereof are disclosed in U.S. Pat. Nos. 6,103,852 and 6,008,312, and in U.S. Publication No. 2002/0115813, which are incorporated herein by reference.

The compositions of the disclosure may comprise at least one poly(urethane-co-urea) formed from poly(urethane-co-urea) prepolymer and curative. Prepolymer to curative ratio can be as high as 1:0.9 or 1:0.95, such as when primary polyamine curatives are used, or as low as 1:1.1 or 1:1.05, such as 1:1.02, such as when secondary polyamine curatives are used. Curative includes polyamines, polyols, polyacids, aminoalcohols, aminoacids, and hydroxy acids, especially those disclosed herein, as well as epoxy-functional reactants, thio-containing reactants, and any other isocyanate-reactive compounds and materials.

Poly(urethane-co-urea) prepolymer refers to isocyanate-functional prepolymer having at least one urethane linkage and at least one urea linkage in the backbone. Such a prepolymer is distinct from polyurethane prepolymer, polyurea prepolymer, and blends thereof. The poly(urethane-co-urea) prepolymer can be formed by reacting excess isocyanate with a blend of at least one polyamine telechelic and at least one polyol telechelic. Molar ratio of polyol telechelic to polyamine telechelic in the blend can be about 0.5:1 to about 10:1, such as about 0.6:1 to about 7:1. Examples of blend include polyether polyols such as polyoxytetramethylene diol and polyether polyamines such as polyoxypropylene diamine.

The poly(urethane-co-urea) composition can be castable, thermoplastic, thermoset, or millable. The % NCO by weight in the prepolymer can be less than about 30%, such as about 15%, about 11%, about 9%, about 7%, or even less, or at least about 2%, such as about 3% or about 4% or greater, or any percentage therebetween, such as about 5-11%, about 6-9.5%, about 3-9%, about 2.5-7.5%, or 4-6.8%. Prepolymers with higher % NCO (e.g., 14%) can be converted to prepolymers with lower % NCO (e.g., 10%) by further reacting with one or more other polyamines, polyols, polyamine telechelics, and/or polyol telechelics (e.g., polyamine polyamides, polyol polysiloxanes).

The poly(urethane-co-urea) prepolymer can be formed by reacting excess isocyanate with an aminoalcohol telechelic (or a blend of two or more thereof), optionally mixed with at least one polyamine reactant and/or at least one polyol reactant. The poly(urethane-co-urea) prepolymer can also be formed by reacting excess isocyanate with a polyamine reactant having at least one urethane linkage in the backbone, or with a polyol reactant having at least one urea linkage in the backbone. Polyamine reactants include any one or more polyamine telechelics and polyamines disclosed herein. Polyol reactants include any one or more polyol telechelics and polyols disclosed herein. The poly(urethane-co-urea) prepolymer can further be formed in situ from a mixture of at least one polyisocyanate, at least one cyclic compound such as cyclic ether, and at least one telechelic chosen from polyamine telechelics, polyol telechelics, and aminoalcohol telechelics as disclosed herein.

The reactive compositions of the present disclosure can be covalently incorporated or functionalized with ionic groups or precursor groups thereof, which can impart desirable properties to the resulting polymer materials. The term "ionic group or precursor group thereof" means a group either already in an anionic or cationic form or else, by neutralization with a reagent, readily converted to the anionic or cationic form respectively. The term "neutralize" as used herein for converting precursor groups to ionic groups refers not only to neutralization using true acids and bases but also includes quaternization and ternarization. Illustrative of precursor anionic groups (and neutralized form) are acid groups like carboxylic group —COOH (—COO$^\ominus$), sulfonic group —SO$_2$OH(—SO$_2$O$^\ominus$), and phosphoric group (i.e., =POOH or =POO$^\ominus$); illustrative of precursor cationic groups (and neutralized form) are ≡N(≡N—$^\oplus$), ≡P(≡P—$^\oplus$), and =S(=S—$^\ominus$).

Without being bound to any particular theory, it is believed that acid functional moieties or groups can improve adhesion of the resulting material to other components or layers in the golf ball, while strong electrostatic interactions among cationic and/or anionic groups form ionic aggregates, which may afford desired mechanical and optical properties such as cut and abrasion resistance and transparency. More than one type of ionic group or precursor group thereof may be incorporated into the reactive composition of the present disclosure. Acid and/or ionic functionalization of the reactive compositions is disclosed, for example, in U.S. Pat. Nos. 6,610,812, 6,207,784, 6,103,822, and 5,661,207.

The ionic groups and/or the precursors thereof can be incorporated into the isocyanate-reactive telechelic (including polyamine telechelics, polyol telechelics, and aminoalcohol telechelics), the isocyanate, and/or the curative before, during, or after the prepolymer formation or the curing reaction. The precursor groups can be neutralized to corresponding ionic groups before, during, or after the prepolymer formation or the curing reaction. Methods and reagents useful for incorporating the ionic groups and/or the precursor groups thereof, for neutralizing the precursor groups into the corresponding ionic groups, including specific examples, as well as the resulting polyisocyantes, polyahls, telechelics, or curatives bearing the ionic groups and/or the precursor groups thereof, are disclosed in parent application bearing Ser. No. 10/859,557 and Publication No. US 2004-0220378 A1, the entirety of which is incorporated by express reference herein.

Additional materials may be incorporated into any of the reactive compositions of the present disclosure, or any one or more of the reactive subcomponents thereof. These additives include, but are not limited to, catalysts to alter the reaction rate, fillers to adjust density and/or modulus, processing aids or oils (e.g., reactive or non-reactive diluents, organic acids such as fatty acids, metal salts thereof, esters thereof such as fatty esters, alcohols derived from such organic acids, such as fatty alcohols) to affect rheological and/or mixing properties, reinforcing materials, impact modifiers, wetting agents, viscosity modifiers, release agents, internal and/or external plasticizers, compatibilizing agents, coupling agents, dispersing agents, crosslinking/vulcanizing agents, defoaming agents, surfactants, lubricants, softening agents, coloring agents including pigments and dyes, optical brighteners, whitening agents, light stabilizers (e.g., UV absorbers, hindered amine light stabilizers), blowing agents, foaming agents, freezing point depressants, cis-to-trans catalysts, organosulfur compounds, moisture scavengers, fragrance or masking compounds, and any other modifying agents known or available to one of ordinary skill in the art. One or more of these additives are used in amounts sufficient to achieve their respective purposes and desired effects. Suitable additives, including specific examples, are disclosed in parent application bearing Ser. No. 10/859,557 and Publication No. US 2004-0220378 A1, the entirety of which is incorporated by express reference herein.

The compositions of the disclosure can be used in amounts of 1-100%, such as 10-90% or 10-75%, to form any portion of the golf ball, optionally in blend with one or more other materials being present in amounts of 1-95%, 10-90%, or 25-90%. The percentages are based on the weight of the portion in question. Conventional materials for golf ball cover, intermediate layer, and core suitable as the other materials include those disclosed in parent application bearing Ser. No. 10/859,557 and Publication No. US 2004-0220378 A1, the entirety of which is incorporated by express reference herein.

The cores of the golf balls formed according to the disclosure may be solid, semi-solid, hollow, fluid-filled, gas-filled, powder-filled, one-piece or multi-component cores. The term "semi-solid" as used herein refers to a paste, a gel, or the like. Any core material known to one of ordinary skill in that art is suitable for use in the golf balls of the disclosure. Suitable core materials include thermoset materials, such as rubber, styrene butadiene, polybutadiene, isoprene, polyisoprene, trans-isoprene, as well as thermoplastics such as ionomer resins, polyamides, and polyesters, and thermoplastic or thermoset polyurethane or polyurea elastomers. As mentioned above, the compositions of the present disclosure may be incorporated into any portion of the golf ball, including the core. For example, an inner core center or a core layer may comprise at least one of the reactive compositions disclosed herein.

The golf ball core can comprise one or more materials chosen from base rubber (natural, synthetic, or a combination thereof, such as polybutadiene), crosslinking initiator (such as dialkyl peroxide), co-crosslinking agent (such as those having di- or polyunsaturation and at least one readily extractable hydrogen in the α position to the unsaturated bonds), filler, cis-to-trans catalyst, organosulfur compound, among others. Choices for these materials are known to one skilled in the art, such as those disclosed in co-pending and co-assigned U.S. Patent Publication No. 2003/0119989, bearing Ser. No. 10/190,705, the disclosure of which is incorporated by reference herein. The core compositions can be used to form any other portions of the golf ball, such as one or more of the intermediate layers and cover layers.

When the golf ball comprises at least one intermediate layer, such as one disposed between the cover and the core, or an inner cover layer or outer core layer, i.e., any layer(s) disposed between the inner core and the outer cover of the golf ball, this layer can be formed from any one or more thermoplastic and thermosetting materials known to those of ordinary skill. These materials can be any and all of the compositions disclosed herein, as well as those disclosed in U.S. Patent Publication No. 2003/0119989.

The intermediate layer may include acid copolymers, acid terpolymers, ionomeric copolymers, ionomerico terpolymers, "modified" ionomers, the structures, compositions, and examples of which are disclosed in parent application bearing Ser. No. 10/859,557 and Publication No. US 2004-0220378 A1, and incorporated by express reference herein.

Ionomers may be blended with conventional ionomeric copolymers and terpolymers, and non-ionomeric thermoplastic resins. The non-ionomeric thermoplastic resins include, without limit, thermoplastic elastomers such as polyurethane, poly-ether-ester, poly-amide-ether, polyether-urea, PEBAX (a family of block copolymers based on polyether-block-amide, commercially supplied by Atochem), styrene-butadiene-styrene (SBS) block copolymers, styrene(ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride grafting, epoxidization etc., elastomers such as EPDM, metallocene catalyzed PE and copolymer, ground up powders of the thermoset elastomers, etc. Such thermoplastic blends can comprise about 1% to about 99% by weight of a first thermoplastic and about 99% to about 1% by weight of a second thermoplastic.

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized. Examples of these materials are disclosed in U.S. Pat. Nos. 6,565,466 and 6,565,455, which are incorporated herein by reference. In addition, polyamides may also be blended with ionomers.

The intermediate layer composition may include 1-99 phr (such as 5-90 phr, 10-75 phr, or 10-50 phr) of at least one grafted metallocene catalyzed polymer and 99-1 phr (such as 95-10 phr, 90-25 phr, or 90-50 phr) of at least one ionomer. The intermediate layer composition may also include at least one ionomer and at least one primarily or fully non-ionomeric thermoplastic material, such as polyamides, polyamide blends, grafted and non-grafted metallocene catalyzed polyolefins and polyamides, polyamide/ionomer blends, polyamide/non-ionomer blends, polyphenylene ether/ionomer blends, and mixtures thereof, like those disclosed in co-pending U.S. Patent Publication No. 2003/0078348, the disclosure of which is incorporated by reference herein. One example of a polyamide/non-ionomer blend is a polyamide and non-ionic polymers produced using non-metallocene single-site catalysts. As used herein, the term "non-metallocene catalyst" or "non-metallocene single-site catalyst" refers to a single-site catalyst other than a metallocene catalyst. Examples of suitable single-site catalyzed polymers are disclosed in U.S. Pat. No. 6,476,130, of which the disclosure is incorporated by reference herein. The intermediate layer may also be formed from the compositions as disclosed in U.S. Pat. No. 5,688,191, the disclosure of which is incorporated by reference herein.

The intermediate layer may also be formed of a binding material and an interstitial material distributed in the binding material, wherein the effective material properties of the intermediate layer can be different for applied forces normal to the surface of the ball from applied forces tangential to the surface of the ball. Examples of this type of intermediate layer are disclosed in U.S. Patent Publication No. 2003/0125134, the entire disclosure of which is incorporated by reference herein. At least one intermediate layer may also be a moisture barrier layer, such as the ones described in U.S. Pat. No. 5,820,488, which is incorporated by reference herein.

One or more of the cover layers may be formed, at least in part, from the compositions of the present disclosure. The cover layers include outer cover layer, inner cover layer, and any intermediate layer disposed between the inner and outer cover layers. The cover compositions can include one or more of the polyurethane prepolymers, polyurea prepolymers, poly(urethane-co-urea) prepolymers, polyisocyanates, curatives, and additives. Other blendable cover materials include those disclosed herein for the core and the intermediate layer.

Suitable golf ball constructions, methods of forming the golf balls, dimple patterns, and post-processing are disclosed in parent application bearing Ser. No. 10/859,557 and Publication No. US 2004-0220378 A1, the entirety of which is incorporated by express reference herein. The compositions disclosed herein may be used in any one or more of these golf ball portions, each of which may have a single-layer or multi-layer structure. As used herein, the term "multi-layer" means at least two layers. Any of these portions can be one of a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gel-filled portion, a powder-filled portion, a gas-filled layer, a hollow portion, or a foamed layer. Physical properties of each golf ball portion, such as hardness, modulus, compression, and thickness/diameter, can affect play characteristics such as spin, initial velocity, and feel. It should be understood that the ranges herein are meant to be intermixed with one another, i.e., the low end of one range may be combined with the high end of another range.

Golf balls and portions thereof of the present disclosure can have any dimensions, i.e., thickness and/or diameter. While USGA specifications limit the size of a competition golf ball to 1.68 inches or greater in diameter, golf balls of any sizes smaller or larger can be used for leisure play. As such, the golf ball diameter can be 1.68-1.8 inches, 1.68-1.76 inches, 1.68-1.74 inches, or 1.7-1.95 inches. Golf ball subassemblies comprising the core and one or more intermediate layers can have a diameter of 80-98% of that of the finished ball. The core may have a diameter of 0.09-1.65 inches, such as 1.2-1.63 inches, 1.3-1.6 inches, 1.4-1.6 inches, 1.5-1.6 inches, or 1.55-1.65 inches. Alternatively, the core diameter can be 1.54 inches or greater, such as 1.55 inches or greater, or 1.59 inches or greater, and 1.64 inches or less. The core diameter can be 90-98% of the ball diameter, such as 94-96%. When the core comprises an inner center and at least one outer core layer, the inner center can have a diameter of 0.9 inches or greater, such as 0.09-1.2 inches or 0.095-1.1 inches, and the outer core layer can have a thickness of 0.13 inches or greater, such as 0.1-0.8 inches, or 0.2 or less, such as 0.12-0.01 inches or 0.1-0.03 inches. Two, three, four, or more outer core layers of different thickness such as the ranges above may be used in combination.

Thickness of the intermediate layer may vary widely, because it can be any one of a number of different layers, e.g., outer core layer, inner cover layer, wound layer, and/or moisture/vapor barrier layer. The thickness of the intermediate layer can be 0.3 inches or less, such as 0.1 inches, 0.09 inches, 0.06 inches, 0.05 inches, or less, and can be 0.002 inches or greater, such as 0.01 inches or greater. The intermediate layer thickness can be 0.01-0.045 inches, 0.02-0.04 inches, 0.025-0.035 inches, 0.03-0.035 inches. Two, three, four, or more of intermediate layers of different thickness such as the ranges above may be used in combination. The core and intermediate layer(s) together form an inner ball, which can have a diameter of 1.48 inches or greater, such as 1.5 inches, 1.52 inches, or greater, or 1.7 inches or less, such as 1.66 inches or less.

The cover thickness can be 0.35 inches or less, such as 0.12 inches, 0.1 inches, 0.07 inches, or 0.05 inches or less, and 0.01 inches or greater, such as 0.02 inches or greater. The cover thickness can be 0.02-0.05 inches, 0.02-0.045 inches, or 0.025-0.04 inches, such as about 0.03 inches. Thickness ratio of the intermediate layer (e.g., as an inner cover layer) to the cover (e.g., as an outer cover layer) can be 10 or less, such as 3 or less, or 1 or less.

Golf balls can comprise layers of different hardness, e.g., hardness gradients, to achieve desired performance characteristics. The hardness of any two adjacent or adjoined layers can be the same or different. One of ordinary skill in the art understands that there is a difference between "material hardness" and "hardness, as measured directly on a golf ball." Material hardness is defined by the procedure set forth in ASTM-D2240 and generally involves measuring the hardness of a flat "slab" or "button" formed of the material in question. Hardness, when measured directly on a golf ball (or other spherical surface) is influenced by a number of factors including, but not limited to, ball construction (i.e., core type, number of core and/or cover layers, etc.), ball (or sphere) diameter, and the material composition of adjacent layers, and can therefore be different from the material hardness. The two hardness measurements are not linearly related and, therefore, cannot easily be correlated.

The cores of the present disclosure may have varying hardness depending at least in part on the golf ball construction. The core hardness as measured on a formed sphere can be at least 15 Shore A, such as at least 30 Shore A, about 50 Shore A to about 90 Shore D, about 80 Shore D or less, about 30-65 Shore D, or about 35-60 Shore D. The intermediate layer(s) of the present disclosure may also vary in hardness, depending at least in part on the ball construction. The hardness of the intermediate layer can be about 30 Shore D or greater, such as about 50 Shore D or greater, about 55 Shore D or greater, or about 65 Shore D or greater, and can be about 90 Shore D or less, such as about 80 Shore D or less or about 70 Shore D or less, or about 55-65 Shore D. The intermediate layer can be harder than the core layer, having a ratio of hardness of about 2 or less, such as about 1.8 or less, or about 1.3 or less. The intermediate layer can be different (i.e., harder or softer) than the core layer with a hardness difference of at least 1 unit in Shore A, C, or D, such as at least 3 units, or at least 5 units, or at least 8 units, or at least 10 units, or less than 20 units, or less than 10 units, or less than 5 units.

The hardness of the cover layer may vary, depending at least in part on the construction and desired characteristics of the golf ball. On the Shore C scale, the cover layer may have a hardness of about 70 Shore C or greater, such as about 80 Shore C or greater, and about 95 Shore C or less, such as about 90 Shore C or less.

The difference or ratio of hardness between the cover layer and the inner ball can be manipulated to influence the aerodynamics and/or spin characteristics of a ball. When the intermediate layer (such as inner cover layer) is at least harder than the cover layer (such as outer cover layer), or intended to be the hardest portion in the ball, e.g., about 50-75 Shore D, the cover layer may have a material hardness of about 20 Shore D or greater, such as about 25 Shore D or greater, or about 30 Shore D or greater, or the cover hardness as measured on the ball can be about 30 Shore D or greater, such as about 30-70 Shore D, about 40-65 Shore D, about 40-55 Shore D, less than about 45 Shore D, less than about 40 Shore D, about 25-40 Shore D, or about 30-40 Shore D. The material hardness ratio of softer layer to harder layer can be about 0.8 or less, such as about 0.75, about 0.7, about 0.5, about 0.45, or less. When the intermediate layer and the cover layer have substantially the same hardness, the material hardness ratio can be about 0.9 or greater, and up to 1.0, and the cover layer may have a hardness of about 55-65 Shore D. Alternatively, the cover layer can be harder than the intermediate layer, with the hardness ratio of the cover layer to the intermediate layer being about 1.33 or less, such as about 1.14 or less.

The core may be softer than the cover. For example, the cover hardness may be about 50-80 Shore D, and the core hardness may be about 30-50 Shore D, with the hardness ratio being about 1.75 or less, such as about 1.55 or less or about 1.25 or less.

As used herein, the terms "Atti compression" or "compression" refers to the deflection of an object or material relative to the deflection of a calibrated spring, as measured with an Atti Compression Gauge available from Atti Engineering Corp. of Union City, N.J. Compression values of the golf ball or portion thereof can be at least in part dependent on the diameter. Atti compression of the core or portion thereof can be 80 or less, such as 75 or less, 40-80, 50-70, 50 or less, 25 or less, 20 or less, 10 or less, or 0, or below the measurable limit of the Atti Compression Gauge. The core or portion thereof may have a Soft Center Deflection Index (SCDI) compression of 160 or less, such as 40-160 or 60-120. The golf ball can have an Atti compression of 40 or greater, such as 55 or greater, 50-120, 60-120, 50-120, 60-100, 75-95, or 80-95.

USGA limits the initial velocity of a golf ball up to 250±5 ft/s. The initial velocity of the golf ball of the present disclosure can be 245-255 ft/s, or greater, such as 250 ft/s or greater, 253-254 ft/s, or about 255 ft/s. Coefficient of restitution (COR) of a ball or a portion thereof is measured by taking the ratio of the outbound or rebound velocity to the inbound or incoming velocity (such as, but not limited to, 125 ft/s). COR can be maximized so that the initial velocity is contained with a certain limit. COR of the golf ball can be 0.7 or greater at an inbound velocity of 125 ft/s, such as 0.75 or greater, 0.78 or greater, 0.8 or greater, and up to about 0.85, such as 0.8-0.815. The core and/or the inner ball can have a COR of 0.78 or more, such as 0.79 or greater.

Spin rate of a golf ball can at least in part be dependent on construction, and can vary off different golf clubs (e.g., driver, woods, irons, wedges, etc.). In a multi-layer (e.g., 2-piece, 3-piece, 4-piece, wound) ball, the driver spin rate can be 2,700 rpm or greater, such as 2,700-3,300 rpm, 2,800-3,500 rpm, 2,900-3,400 rpm, or less than 2,700 rpm. Non-limiting measurements of spin rate are disclosed in U.S. Pat. Nos. 6,500,073, 6,488,591, 6,286,364, and 6,241,622, which are incorporated by reference herein.

As used herein, the term "flexural modulus" or "modulus" refers to the ratio of stress to strain within the elastic limit (measured in flexural mode) of a material, indicates the bending stiffness of the material, and is similar to tensile modulus. Flexural modulus, typically reported in Pascal ("Pa") or pounds per square inch ("psi"), is measured in accordance to ASTM D6272-02.

The intermediate layer (e.g., outer core layer, inner cover layer) can have any flexural modulus of 500-500,000 psi, such as 1,000-250,000 psi or 2,000-200,000 psi. The flexural modulus of the cover layer (e.g., outer cover layer, inner cover layer, intermediate cover layer) can be 2,000 psi or greater, such as 5,000 psi or greater, 10,000-150,000 psi, 15,000-120,000 psi, 18,000-110,000 psi, 100,000 psi or less, 80,000 or less, 70,000 psi or less, 10,000-70,000 psi, 12,000-60,000 psi, or 14,000-50,000 psi.

The cover layer (e.g., inner cover, intermediate cover, outer cover layers) can have any flexural modulus, such as the numerical ranges illustrated for intermediate layer above. When the cover layer has a hardness of 50-60 Shore D, the flexural modulus can be 55,000-65,000 psi. In multi-layer covers, the cover layers can have substantially the same hardness but different flexural moduli. The difference in flexural modulus between any two cover layers can be 10,000 psi or less, 5,000 psi or less, or 500 psi or greater, such as 1,000-2,500 psi. The ratio in flexural modulus of the intermediate layer to the cover layer can be 0.003-50, such as 0.006-4.5 or 0.11-4.5.

The specific gravity of a cover or intermediate layer can be at least 0.7, such as 0.8 or greater, 0.9 or greater, 1 or greater, 1.05 or greater, or 1.1 or greater. The core may have a specific gravity of 1 or greater, such as 1.05 or greater. In one example, the intermediate layer has a specific gravity of 0.9 or greater and the cover has a specific gravity of 0.95 or greater. In another example, the core specific gravity is 1.1 or greater and the cover specific gravity is about 0.95 or greater.

The adhesion, or peel, strength of the compositions as presently disclosed can be 5 lb/in or greater, such as 10 lb/in or greater, 20 lb/in or greater, 24 lb/in or greater, or 26 lb/in or greater, or 30 lb/in or less, such as 25 lb/in, 20 lb/in, or less. Adhesion strength of a golf ball layer can be assessed using cross-hatch test (i.e., cutting the material into small pieces in mutually perpendicular directions, applying a piece of adhesive cellophane tape over the material, rapidly pulling off the tape, and counting the number of pieces removed) and repeated ball impact test (i.e., subjecting the finished golf ball to repeated impact and visually examining the coating film for peeling), as disclosed in U.S. Pat. No. 5,316,730, which is incorporated by reference herein.

Water resistance of a golf ball portion can be reflected by absorption (i.e., weight gain following a period of exposure at a specific temperature and humidity differential) and transmission (i.e., water vapor transmission rate (WVTR) according to ASTM E96-00, which refers to the mass of water vapor that diffuses into a material of a given thickness per unit area per unit time at a specific temperature and humidity differential). The golf ball or a portion thereof can have a weight gain of 0.15 g or less, such as 0.13 g, 0.09 g, 0.06 g, 0.03 g, or less, and a diameter gain of 0.001 inches or less, over seven weeks at 100% relative humidity and 72° F. The golf ball portion such as the outer or inner cover layer can have a WVTR of 2 g/($m^2$×day) or less, such as 0.45-0.95 g/($m^2$×day), 0.01-0.9 g/($m^2$×day), or less, at 38° C. and 90% relative humidity.

The shear/cut resistance of a golf ball portion (e.g., inner or outer cover layer) may be determined using a shear test having a scale from 1 to 6 in damage and appearance. The cover layer can have a number of 3, 2, 1, or less on the shear test scale.

Light stability (such as to UV irradiance power of 1.00 W/$m^2$/nm) of the cover layer (e.g., a visible layer such as an outer cover layer or an inner/intermediate cover layer having transparent or translucent outer cover layers) may be quantified using difference in yellowness index (ΔYI, according to ASTM D1925) before and after a predetermined period (such as 120 hrs) of exposure. The ΔYI of the cover layer can be 10 or less, such as 6, 4, 2, 1, or less. Difference in yellow-to-blue chroma dimension before and after the exposure (Δb*) can also quantify light stability. The Δb* of the cover layer can be 4 or less, such as 3, 2, 1, or less.

The forgoing disclosure and the claims below are not to be limited in scope by the illustrative examples presented herein. Any equivalent examples are intended to be within the scope of this disclosure. For example, while disclosure is directed mainly to compositions for use in golf balls, the same compositions may be used in other golf equipment such as putters (e.g., as inserts or in the grip), golf clubs and portions thereof (e.g., heads, shafts, or grips), golf shoes and portions thereof, and golf bags and portions thereof. Indeed, various modifications of the disclosure in addition to those shown and described herein will become apparent to those skilled in the art from the foregoing description. Such modifications are also intended to fall within the scope of the appended claims. Disclosures of relevant subject matters in all patents, applications, and publications as cited in the foregoing disclosure are expressly incorporate herein by reference in their entirety.

We claim:

1. A golf ball comprising a core and at least one layer disposed about the core, wherein the layer comprises a material formed from a composition comprising at least one polyamine having a structure of:

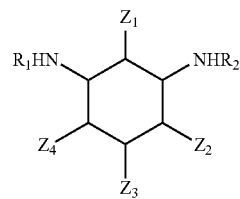 or 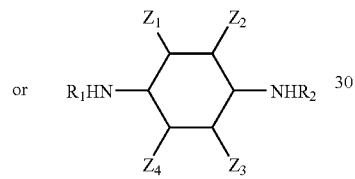

where $R_1$ and $R_2$ are the same or different radicals each comprising hydrogen or an organic radical having 1-60 carbon atoms;

$Z_1$, $Z_2$, and $Z_4$ are the same or different radicals each comprising a halogen or an organic radical having about 1-60 carbon atoms; and $Z_3$ is a hydrogen, a halogen, or an organic radical having about 1-60 carbon atoms;

wherein at least one of $R_1$, $R_2$, $Z_1$, $Z_2$, $Z_3$ and $Z_4$ comprises cyclopentyl or cyclohexyl groups.

2. The golf ball of claim 1, wherein the layer is an outer cover layer.

3. The golf ball of claim 1, wherein the layer is an intermediate layer between the core and an outer cover layer.

4. The golf ball of claim 1, wherein the layer has a thickness of 0.005 inches to 0.125 inches.

5. The golf ball of claim 1, wherein the layer has a Shore D hardness of 20 to 80.

6. A golf ball comprising a core and at least one layer disposed about the core, wherein the layer comprises a material formed from a composition comprising at least one polyamine having a structure of:

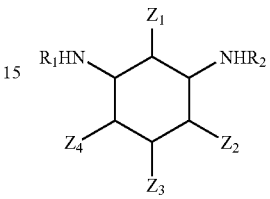 or 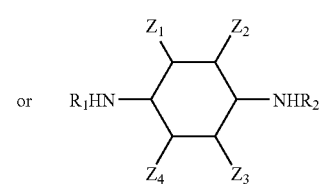

where $R_1$ and $R_2$ are the same or different radicals each comprising hydrogen or an organic radical having 1-60 carbon atoms;

$Z_1$, $Z_2$, and $Z_4$ are the same or different radicals each comprising a halogen or an organic radical having about 1-60 carbon atoms; and $Z_3$ is a hydrogen, a halogen, or an organic radical having about 1-60 carbon atoms;

wherein at least one of $R_1$, $R_2$, $Z_1$, $Z_2$, $Z_3$ and $Z_4$ comprises —$SCH_3$.

7. The golf ball of claim 6, wherein the polyamine has one of the following structures:

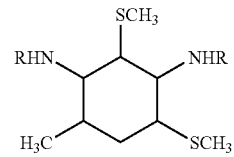 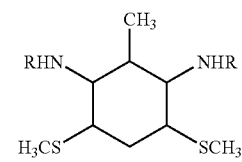

where R is the same or different radicals each comprising hydrogen, liner or branched $C_1$-$C_6$ alkyl groups, propanenitrile groups, or maleate groups.

* * * * *